United States Patent
B et al.

(10) Patent No.: US 12,538,480 B2
(45) Date of Patent: Jan. 27, 2026

(54) PERIPHERAL CIRCUITS FOR LOW VOLTAGE PROGRAMMABLE NON-VOLATILE MEMORY

(71) Applicant: Texas Instruments Incorporated, Dallas, TX (US)

(72) Inventors: Krishnanunni B, Bangalore (IN); Devraj Rajagopal, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 803 days.

(21) Appl. No.: 17/876,834

(22) Filed: Jul. 29, 2022

(65) Prior Publication Data

US 2023/0397413 A1    Dec. 7, 2023

Related U.S. Application Data

(60) Provisional application No. 63/348,649, filed on Jun. 3, 2022.

(51) Int. Cl.
*H10B 41/00* (2023.01)
*H10B 20/00* (2023.01)

(52) U.S. Cl.
CPC ................ *H10B 20/60* (2023.02)

(58) Field of Classification Search
CPC ........ H10B 53/00; H10B 53/30; H10B 69/00; H10B 53/40; H10B 20/60; H10B 41/40; H10B 43/40; H01L 21/70; H01L 21/02; H01L 21/285; H01L 21/302; H01L 21/66; G11C 11/34; G11C 16/04; G11C 17/18; G11C 14/00; G11C 17/08; G11C 17/12; G11C 7/00

See application file for complete search history.

(56) References Cited

U.S. PATENT DOCUMENTS 7,388,420 B2 *  6/2008  Diorio .................. G11C 16/045
                                                           327/525

* cited by examiner

*Primary Examiner* — Thong Q Le
(74) *Attorney, Agent, or Firm* — Andrew R. Ralston; Frank D. Cimino

(57) ABSTRACT

A semiconductor device includes core circuits configured to operate at a core bias potential, input/output (I/O) circuits configured to operate at an I/O bias potential higher than the core bias potential, and a non-volatile memory having a peripheral circuit configured to operate at a memory program bias potential that is higher than the I/O bias potential. The peripheral circuit is also configured to operate at the core bias potential. The peripheral circuit has an input buffer; a threshold potential at an input buffer input node of the input buffer is less than the core bias potential. The peripheral circuit may be manifested as a low voltage supply detection circuit. The peripheral circuit may be manifested as a level shifter circuit. The peripheral circuit may be manifested as a sense circuit. The input buffer may include a drain extended core transistor to provide the desired threshold potential.

20 Claims, 11 Drawing Sheets

PERIPHERAL CIRCUITS FOR LOW VOLTAGE PROGRAMMABLE NON-VOLATILE MEMORY

CROSS-REFERENCE TO RELATED APPLICATIONS

This application claims the benefit of priority under 35 U.S.C. § 119(e) of U.S. Provisional Application No. 63/348,649, filed Jun. 3, 2022, which is hereby incorporated by reference in its entirety.

TECHNICAL FIELD

This disclosure relates to the field of semiconductor devices. More particularly, but not exclusively, this disclosure relates to non-volatile memories in semiconductor devices.

BACKGROUND

Some semiconductor devices include logic circuits and programmable non-volatile memory. The logic circuits may operate at less than 2.0 volts, while the programmable non-volatile memory may require more than 6 volts to program the memory cells. Integrating peripheral circuits for the programmable non-volatile memory which operate at higher voltages, such as sense circuits for read operations and level shifters for programming operations, with the low voltage logic circuits, while reducing fabrication costs, has been challenging.

SUMMARY

A semiconductor device includes core circuits having core n-channel metal oxide semiconductor (NMOS) transistors and core p-channel metal oxide semiconductor (PMOS) transistors, coupled between a core bias interconnect network and a ground network. The core circuits are configured to operate at a core bias potential on the core bias interconnect network with respect to a ground potential on the ground network.

The semiconductor device includes input/output (I/O) circuits including I/O NMOS transistors and I/O PMOS transistors, coupled between an I/O bias interconnect network and the ground network. The I/O circuits are configured to operate at an I/O bias potential on the I/O bias interconnect network with respect to the ground potential on the ground network.

The semiconductor device includes a non-volatile memory having memory cells and a peripheral circuit. The peripheral circuit is coupled between a memory bias interconnect network and the ground network. The peripheral circuit is configured to operate at a memory program bias potential on the memory bias interconnect network with respect to the ground potential on the ground network. The peripheral circuit is also configured to operate at the core bias potential on the memory bias interconnect network. The peripheral circuit has an input buffer, wherein a threshold potential at an input buffer input node of the input buffer is less than the core bias potential.

In one aspect, the peripheral circuit is manifested as a low voltage supply detection circuit. The input buffer includes an input buffer output node. The low voltage supply detection circuit includes an output buffer coupled between the memory bias interconnect network and the ground network. The output buffer has an output buffer input node coupled to the input buffer output node of the input buffer. The output buffer has an output buffer output node. The output buffer is configured to provide an output signal at the output buffer output node, the output signal being equal to a potential on the memory bias interconnect network when a potential on the input buffer input node of the input buffer is equal to the ground potential, and equal to the ground potential when the potential on the input buffer input node of the input buffer is equal to the core bias potential.

In another aspect, the peripheral circuit is manifested as a level shifter circuit. The input buffer includes a second input buffer input node, wherein a threshold potential of the input buffer at the second input buffer input node is less than the core bias potential. The input buffer has a first input buffer output node and a second input buffer output node. The level shifter circuit includes an output buffer coupled between the memory bias interconnect network and the ground network. The output buffer has a first output buffer input node coupled to the first input buffer output node of the input buffer, and has a second output buffer input node coupled to the second input buffer output node of the input buffer. The output buffer has an output buffer output node. The output buffer is configured to provide an output signal at the output buffer output node. The output signal is equal to a potential on the memory bias interconnect network when a potential on the input buffer input node of the input buffer is equal to the core bias potential and a potential on the second input buffer input node of the input buffer is equal to the ground potential. The output signal is equal to the potential on the ground network when the potential on the input buffer input node of the input buffer is equal to the ground potential and a potential on the second input buffer input node of the input buffer is equal to the core bias potential.

In a further aspect, the peripheral circuit is manifested as a sense circuit. The input buffer is manifested as a sense buffer. The sense buffer has a sense buffer output node. The sense circuit has an output buffer coupled between the core bias interconnect network and the ground network. The output buffer has an output buffer input node coupled to the sense buffer output node of the sense buffer. The output buffer has an output buffer output node. The output buffer is configured to provide an output signal at the output buffer output node. The output signal is equal to the ground potential when a potential on the sense buffer input node of the sense buffer is equal to the ground potential. The output signal is equal to the ground potential when a potential on the sense buffer input node of the sense buffer is equal to the core bias potential and current flowing into the sense buffer from the memory data line is less than a memory threshold potential current. The output signal is equal to the core bias potential when a potential on the sense buffer input node of the sense buffer is equal to the core bias potential and current flowing into the sense buffer from the memory data line is greater than the memory threshold potential current.

Another aspect includes a semiconductor device and a method of making the same. A nonvolatile bit cell array is formed in or over the semiconductor substrate, the bit cell array being configured to receive an operating voltage from a memory bias interconnect network. A peripheral circuit is coupled to the bit cell array and is configured to receive the operating voltage and to provide an electrical function for operation of the bit cell array. The peripheral circuit includes a drain-extended MOS (DEMOS) transistor configured to receive the operating voltage at a drain input, and to receive a core bias potential at a gate input.

DETAILED DESCRIPTION

The present disclosure is described with reference to the attached figures. The figures are not drawn to scale and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For the purposes of this disclosure, it will be understood that, if a component is disclosed as being "connected" or "coupled" to another component, it may be directly connected or directly coupled to the other element, or intervening components may be present. In either case, the components that are coupled or connected together are capable of supporting a steady electrical current, that is, direct current (DC), between the components. If a component is referred to as being "directly coupled' or "directly connected" to another component, it is understood there are no other intentionally disposed intervening components present. Components which are not capable of DC electrical conductivity between them, but may be affected by mutual inductive or capacitive effects, are not considered to be coupled or connected unless specifically disclosed to be so. The term "equal", as applied to two signals or voltages, unless otherwise stated allows for small deviations from perfect equality of the signals or voltages being related to each other. Such deviations may be consistent with, for example, voltage drop due to transistor channel resistance or due to a p-n junction.

Various components described herein are described to as "drain extended" or "DE" MOS transistors. Such components may be referred to as "DEMOS", or in the case of an NMOS transistor, "DENMOS". Transistors that do not have an extended drain may be referred to as a "MOS" transistor or a "non-DE" MOS transistor. N-type and P-type non-DE MOS transistors may be referred to as "NMOS" or "PMOS" transistors, respectively.

Various disclosed devices or methods of the present disclosure may be beneficially applied to memory devices, for example to provide improved operation at low operating voltages. While such examples may be expected to beneficially make such memory devices more robust to at low or variable operating voltages, no particular result is a requirement unless explicitly recited in a particular claim.

Figure 1:
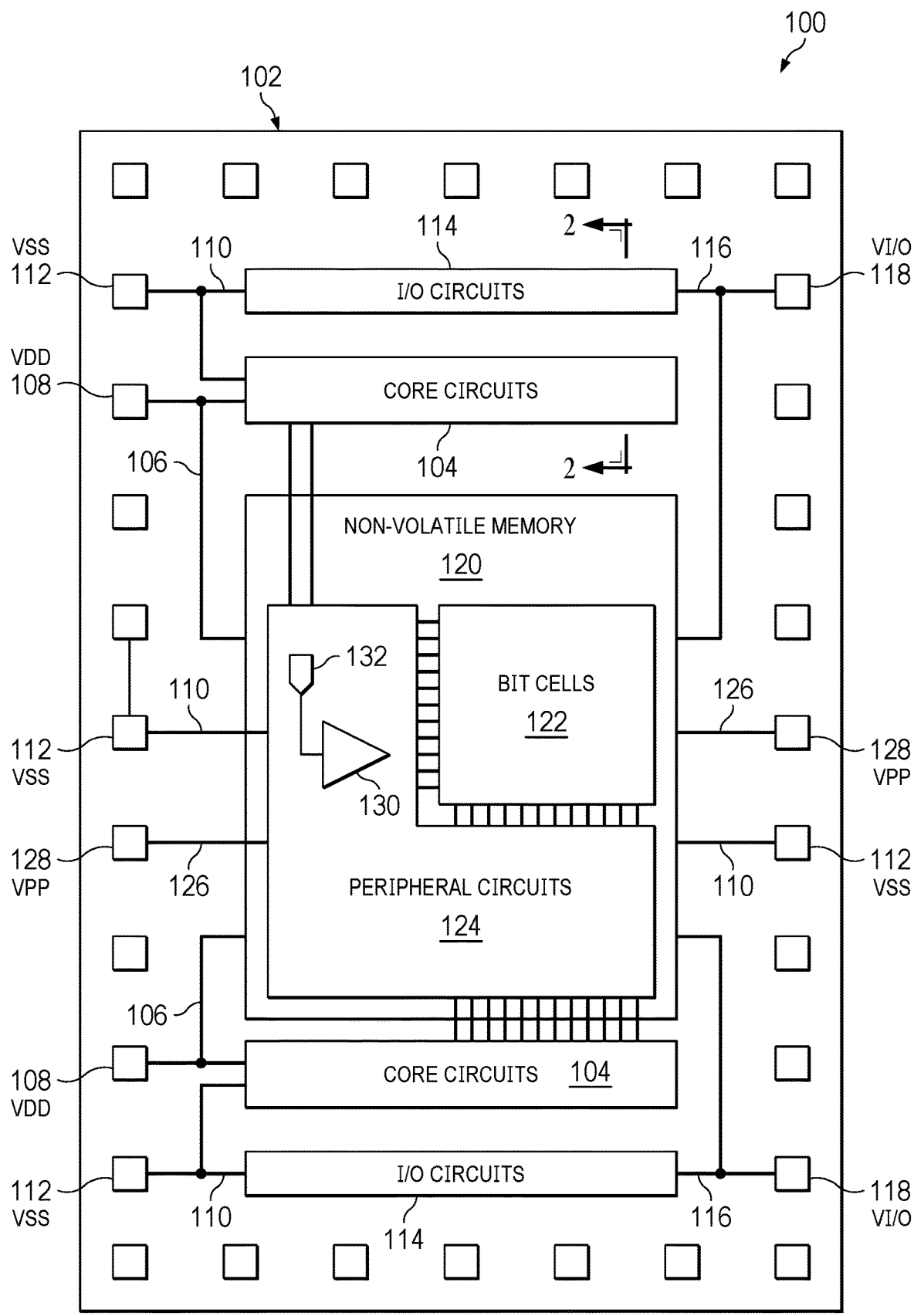
FIG. 1 is a top view of an example semiconductor device that includes core circuits, input/output (I/O) circuits, and a non-volatile memory.

FIG. 1 is a top view of an example semiconductor device that includes core circuits, input/output (I/O) circuits, and a non-volatile memory. The semiconductor device 100 includes a substrate 102 which has a semiconductor material, such as silicon.

The core circuits 104 may be located in more than one area of the semiconductor device 100, as depicted in FIG. 1. The core circuits 104 include core n-channel metal oxide semiconductor (NMOS) transistors and core p-channel metal oxide semiconductor (PMOS) transistors, shown in FIG. 2, formed in and on the semiconductor material, shown in more detail in FIG. 2. The semiconductor device 100 includes a core bias interconnect network 106 connected to core bias bond pads 108, labeled "VDD" in FIG. 1. The semiconductor device 100 includes a ground network 110 connected to ground bias bond pads 112, labeled "VSS" in FIG. 1. The ground network 110 includes interconnects coupled to the ground bias bond pads 112 and portions of the substrate 102. The core circuits 104 are coupled between the core bias interconnect network 106 and the ground network 110. The core circuits 104 are configured to operate at a core bias potential on the core bias interconnect network 106 with respect to a ground potential on the ground network 110. The core bias potential may be less than 2.0 volts, for example, 1.0 volts to 1.98 volts.

The I/O circuits may be located in more than one area of the semiconductor device 100, as depicted in FIG. 1. The I/O circuits include I/O NMOS transistors and I/O PMOS transistors, shown in FIG. 2, formed in and on the semiconductor material. The semiconductor device 100 includes an I/O bias interconnect network 116 connected to I/O bias bond pads 118, labeled "VI/O" in FIG. 1. The I/O circuits 114 are coupled between the I/O bias interconnect network 116 and the ground network 110. The I/O circuits 114 are configured to operate at an I/O bias potential on the I/O bias interconnect network 116 with respect to the ground potential on the ground network 110. The I/O bias potential may be 4.0 volts to 6.0 volts.

The non-volatile memory 120 includes memory cells 122 and peripheral circuits 124. The semiconductor device 100 includes a memory bias interconnect network 126 connected to memory bias bond pads 128, labeled "VPP" in FIG. 1. The peripheral circuits 124 are coupled between the memory bias interconnect network 126 and the ground network 110. The memory bias interconnect network 126 provides an operating voltage to the peripheral circuits 124. The peripheral circuits 124 are configured to operate at the core bias potential or a memory program bias potential on the memory bias interconnect network 126, and the operating voltage may be one of the core bias potential or the memory program bias potential, depending on the operating mode of the non-volatile memory 120. The memory program bias potential may be 7.0 volts to 9.0 volts. The peripheral circuits 124 are also configured to operate at the core bias potential on the memory bias interconnect network 126. The peripheral circuits 124 have an input buffer 130 with an input buffer input node 132. A threshold potential of the input buffer 130 at the input buffer input node 132 is less than the core bias potential.

During operation of the semiconductor device 100, the core bias potential is applied to the core bias bond pads 108, to operate the core circuits 104. The I/O bias potential is applied to the I/O bias bond pads 118, to operate the I/O circuits 114. The memory program bias potential may be applied to the memory bias bond pads 128, to program the memory cells 122. The core bias potential may be applied to the memory bias bond pads 128, to read the memory cells 122.

Figure 2:
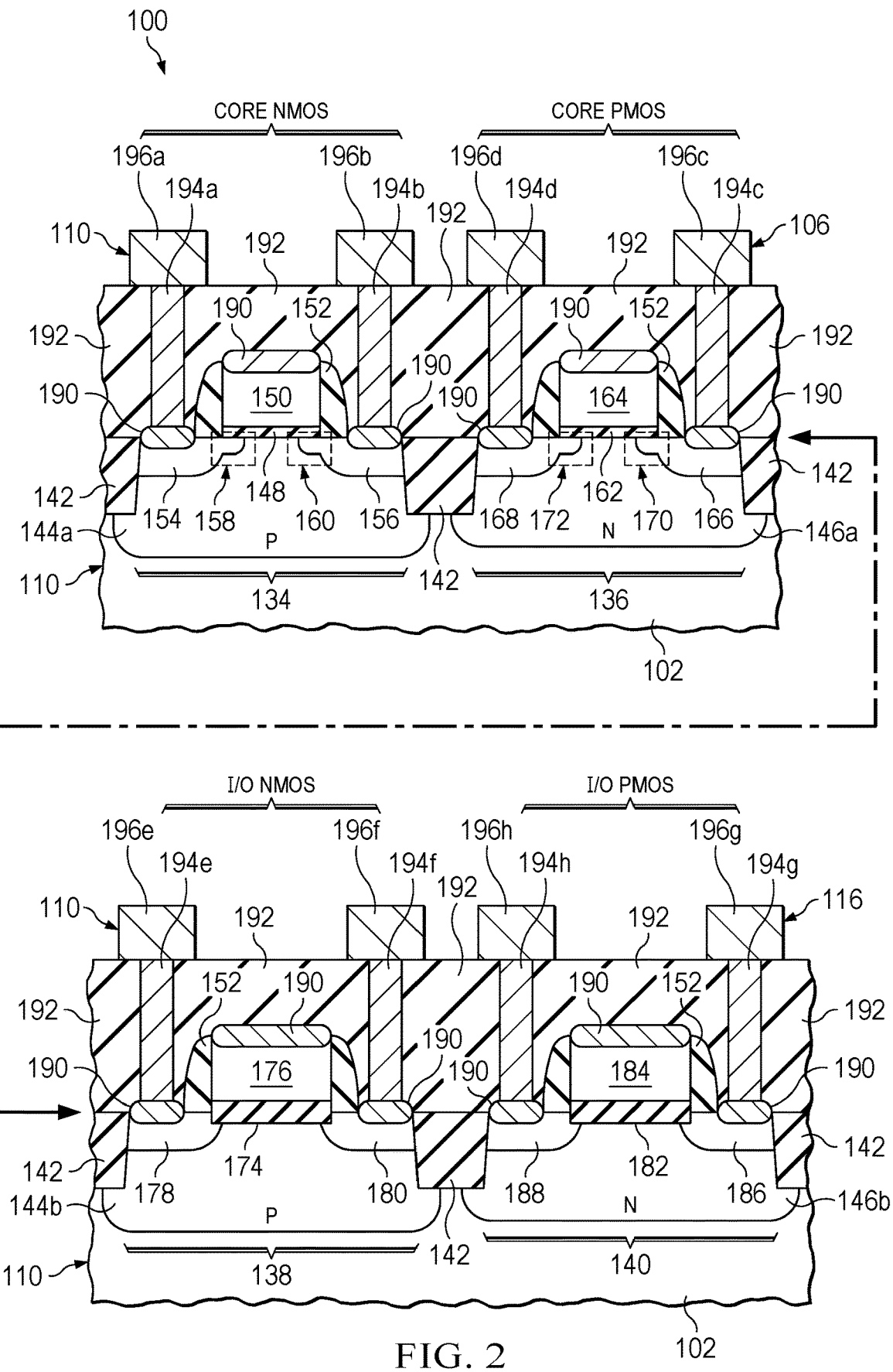
FIG. 2 is a cross section of the semiconductor device of FIG. 1, depicting examples of the core NMOS transistors, the core PMOS transistors, the I/O NMOS transistors, and the I/O PMOS transistors.

FIG. 2 is a cross section of the semiconductor device 100 of FIG. 1, depicting examples of the core NMOS transistors, the core PMOS transistors, the I/O NMOS transistors, and the I/O PMOS transistors. The core NMOS transistor 134, the core PMOS transistor 136, the I/O NMOS transistor 138, and the I/O PMOS transistor 140 are formed in and on the substrate 102. The substrate 102 may be part of the ground network 110.

A field relief dielectric layer 142, commonly referred to as field oxide, is formed in and on the substrate 102. The field relief dielectric layer 142 may be formed by a shallow trench isolation (STI) process and have an STI structure in which the field relief dielectric layer 142 is formed in a trench in the substrate 102, as depicted in FIG. 2. Alternatively, the field relief dielectric layer 142 may be formed by a local oxidation of silicon (LOCOS) process and have a LOCOS structure, in which the field relief dielectric layer 142 would have tapered edges, and extend partway into the substrate 102 and extend partway above the substrate 102.

P-type wells 144*a* and 144*b* are formed in the substrate 102 in areas for the core NMOS transistor 134 and the I/O NMOS transistor 138, respectively. The p-type wells 144*a* and 144*b* may be formed concurrently, advantageously reducing fabrication cost and fabrication complexity of the semiconductor device 100. N-type wells 146*a* and 146*b* are formed in the substrate 102 in areas for the core NMOS transistor 134 and the I/O NMOS transistor 138, respectively. The n-type wells 146*a* and 146*b* may also be formed concurrently, accruing similar advantages.

The core NMOS transistor 134 includes a thin NMOS gate dielectric layer 148 formed on the substrate 102. The thin NMOS gate dielectric layer 148 may include silicon dioxide, formed by a thermal oxidation process. The thin NMOS gate dielectric layer 148 may include high-k dielectric materials, such as hafnium oxide, zirconium oxide, or tantalum oxide. The thin NMOS gate dielectric layer 148 may be less than 3 nanometers thick, consistent with the core bias potential being less than 2.0 volts.

The core NMOS transistor 134 includes a core NMOS gate 150 formed on the thin NMOS gate dielectric layer 148. In one version of this example, the core NMOS gate 150 may include primarily polycrystalline silicon, commonly referred to as polysilicon, with n-type dopants such as phosphorus, arsenic, or antimony. In another version, the core NMOS gate 150 may include primarily metal silicide, such as titanium silicide, cobalt silicide, or nickel silicide, to provide a fully silicided (FUSI) gate. In a further version, the core NMOS gate 150 may include metals, such as titanium, titanium nitride, tantalum, tantalum nitride, tungsten, or tungsten nitride, to provide a metal gate.

The core NMOS transistor 134 may include sidewall spacers 152 formed on lateral surfaces of the core NMOS gate 150. The sidewall spacers 152 may include silicon dioxide and silicon nitride.

The core NMOS transistor 134 includes a core n-type source 154 and a core n-type drain 156 formed in the substrate 102 on alternate sides of the core NMOS gate 150. The core n-type source 154 may include a core n-type source extension 158 extending partway under the core NMOS gate 150. The core n-type drain 156 may include a core n-type drain extension 160 extending partway under the core NMOS gate 150. The core n-type source extension 158 and the core n-type drain extension 160 are formed concurrently, prior to forming the sidewall spacers 152. Remaining portions of the core n-type source 154 and the core n-type drain 156 are formed concurrently, after forming the sidewall spacers 152. The core n-type source 154 and the core n-type drain 156 include n-type dopants, such as phosphorus, arsenic, or antimony. The core n-type source extension 158 and the core n-type drain extension 160 may advantageously reduce an on-state resistance of the core NMOS transistor 134.

The core PMOS transistor 136 includes a thin PMOS gate dielectric layer 162 formed on the substrate 102. The thin PMOS gate dielectric layer 162 may have a composition similar to the thin NMOS gate dielectric layer 148. Portions or all of the thin PMOS gate dielectric layer 162 and the thin NMOS gate dielectric layer 148 may be formed concurrently, advantageously reducing fabrication cost and fabrication complexity of the semiconductor device 100. The thin PMOS gate dielectric layer 162 may be less than 3.0 nanometers thick, consistent with the core bias potential being less than 2.0 volts.

The core PMOS transistor 136 includes a core PMOS gate 164 formed on the thin PMOS gate dielectric layer 162. Portions of the core PMOS gate 164 and the core NMOS gate 150 may be formed concurrently, further reducing fabrication cost and fabrication complexity of the semiconductor device 100. In one version of this example, the core PMOS gate 164 may include primarily polysilicon, with p-type dopants such as boron, gallium, or indium. In other versions, the core PMOS gate 164 may be implemented as a FUSI gate or a metal gate. The sidewall spacers 152 are formed on lateral surfaces of the core PMOS gate 164, concurrently with the sidewall spacers 152 on the core NMOS gate 150.

The core PMOS transistor 136 includes a core p-type source 166 and a core p-type drain 168 formed in the substrate 102 on alternate sides of the core PMOS gate 164. The core p-type source 166 may include a core p-type source extension 170 extending partway under the core PMOS gate 164. The core p-type drain 168 may include a core p-type drain extension 172 extending partway under the core PMOS gate 164. The core p-type source extension 170 and the core p-type drain extension 172 are formed concurrently, prior to forming the sidewall spacers 152. Remaining portions of the core p-type source 166 and the core p-type drain 168 are formed concurrently, after forming the sidewall spacers 152. The core p-type source 166 and the core p-type drain 168 include p-type dopants, such as boron, gallium, or indium.

The I/O NMOS transistor 138 includes a thick NMOS gate dielectric layer 174 formed on the substrate 102. The thick NMOS gate dielectric layer 174 may include silicon dioxide, formed by a thermal oxidation process. The thick NMOS gate dielectric layer 174 may be 10 nanometers to 30 nanometers thick, consistent with the I/O bias potential being 4.0 volts to 6.0 volts.

The I/O NMOS transistor 138 includes an I/O NMOS gate 176 formed on the thick NMOS gate dielectric layer 174. The I/O NMOS gate 176 may be formed concurrently with the core NMOS gate 150. The I/O NMOS gate 176 and the core NMOS gate 150 may have similar compositions and thicknesses. The sidewall spacers 152 are formed on lateral surfaces of the I/O NMOS gate 176, concurrently with the sidewall spacers 152 on the core NMOS gate 150.

The I/O NMOS transistor 138 includes an I/O n-type source 178 and an I/O n-type drain 180 formed in the substrate 102 on alternate sides of the I/O NMOS gate 176. The I/O n-type source 178 and the I/O n-type drain 180 extend partway under the I/O NMOS gate 176. The I/O n-type source 178 and the I/O n-type drain 180 include n-type dopants, such as phosphorus, arsenic, or antimony. The I/O n-type source 178 and the I/O n-type drain 180 are formed concurrently with the portions of the core n-type source 154 and the core n-type drain 156 that are formed after forming the sidewall spacers 152, further reducing fabrication cost and complexity compared to forming the I/O n-type source 178 and the I/O n-type drain 180 separately from the core n-type source 154 and the core n-type drain 156. The I/O n-type source 178 and the I/O n-type drain 180 do not include source and drain extensions under the I/O NMOS gate 176; omitting source and drain extensions may reduce channel hot carrier injection and thus advantageously improve reliability of the I/O NMOS transistor 138.

The I/O PMOS transistor 140 includes a thick PMOS gate dielectric layer 182 formed on the substrate 102. The thick PMOS gate dielectric layer 182 may have a composition similar to the thick NMOS gate dielectric layer 174. Portions or all of the thick PMOS gate dielectric layer 182 and the thick NMOS gate dielectric layer 174 may be formed concurrently, further reducing fabrication cost and complexity. The thick PMOS gate dielectric layer 182 may be 10 nanometers to 30 nanometers thick, consistent with the I/O bias potential being 4.0 volts to 6.0 volts.

The I/O PMOS transistor 140 includes an I/O PMOS gate 184 formed on the thick PMOS gate dielectric layer 182. The I/O PMOS gate 184 may be formed concurrently with the core PMOS gate 164. The sidewall spacers 152 are formed on lateral surfaces of the I/O PMOS gate 184, concurrently with the sidewall spacers 152 on the core NMOS gate 150.

The I/O PMOS transistor 140 includes an I/O p-type source 186 and an I/O p-type drain 188 formed in the substrate 102 on alternate sides of the I/O PMOS gate 184. The I/O p-type source 186 and the I/O p-type drain 188 extend partway under the I/O PMOS gate 184. The I/O p-type source 186 and the I/O p-type drain 188 include p-type dopants, such as boron, gallium, or indium. The I/O p-type source 186 and the I/O p-type drain 188 are formed concurrently with the portions of the core p-type source 166 and the core p-type drain 168 that are formed after forming the sidewall spacers 152, further reducing fabrication cost and complexity. The I/O p-type source 186 and the I/O p-type drain 188 do not include source and drain extensions under the I/O PMOS gate 184; omitting source and drain extensions may reduce threshold instability and thus advantageously improve reliability of the I/O PMOS transistor 140.

The semiconductor device 100 may include metal silicide 190 formed on exposed silicon of the substrate 102 and the gates 150, 164, 176, and 184. The metal silicide 190 may include titanium silicide, cobalt silicide, or nickel silicide, by way of example.

The semiconductor device 100 includes a pre-metal dielectric (PMD) layer 192, formed over the substrate 102, the field relief dielectric layer 142 and the metal silicide 190. The PMD layer 192 is electrically non-conductive, and may include one or more sublayers of dielectric material. By way of example, the PMD layer 192 may include a PMD liner, not specifically shown, of silicon nitride, contacting the substrate 102, the field relief dielectric layer 142 and the metal silicide 190. The PMD layer 192 may also include a planarized layer, not specifically shown, of silicon dioxide, phosphosilicate glass (PSG), fluorinated silicate glass (FSG), or borophosphosilicate glass (BPSG), on the PMD liner. The PMD layer 192 may further include a PMD cap layer, not specifically shown, of silicon nitride, silicon carbide, or silicon carbonitride, suitable for an etch-stop layer of a chemical-mechanical polish (CMP) stop layer, on the planarized layer. Other layer structures and compositions for the PMD layer 192 are within the scope of this example.

Contacts, including a core NMOS source contact 194a, a core NMOS drain contact 194b, a core PMOS source contact 194c, a core PMOS drain contact 194d, an I/O NMOS source contact 194e, an I/O NMOS drain contact 194f, an I/O PMOS source contact 194g, and an I/O PMOS drain contact 194h, are formed through the PMD layer 192, making electrical connections through the metal silicide 190 to the core n-type source 154, the core n-type drain 156, the core p-type source 166, the core p-type drain 168, the I/O n-type source 178, the I/O n-type drain 180, the I/O p-type source 186, and the I/O p-type drain 188, respectively. The contacts 194a through 194h are electrically conductive, and may include a contact liner, not specifically shown, of titanium and titanium nitride contacting the PMD layer 192 and the metal silicide 190, with a tungsten core, not specifically shown, on the contact liner. Other structures and compositions for the contacts 194a through 194h are within the scope of this example.

Interconnects, including a core NMOS source interconnect 196a, a core NMOS drain interconnect 196b, a core PMOS source interconnect 196c, a core PMOS drain interconnect 196d, an I/O NMOS source interconnect 196e, an I/O NMOS drain interconnect 196f, an I/O PMOS source interconnect 196g, and an I/O PMOS drain interconnect 196h, are formed on the PMD layer 192, making electrical connections to the core NMOS source contact 194a, the core NMOS drain contact 194b, the core PMOS source contact 194c, the core PMOS drain contact 194d, the I/O NMOS source contact 194e, the I/O NMOS drain contact 194f, the I/O PMOS source contact 194g, and the I/O PMOS drain contact 194h, respectively. In one version of this example, the interconnects 196a through 196h are electrically conductive. In one version of this example, the interconnects 196a through 196h may have an etched aluminum structure, and may include an adhesion layer, not shown, of titanium or titanium tungsten, on the PMD layer 192, a lower barrier layer of titanium nitride on the adhesion layer, an aluminum layer, not shown, with a few atomic percent of silicon, titanium, or copper, on the lower barrier layer, and an upper barrier layer, not shown, of titanium nitride on the aluminum layer. In another version of this example, the interconnects 196a through 196h may have a damascene structure, and may include a barrier liner of tantalum and tantalum nitride in an interconnect trench in an intra-metal dielectric (IMD) layer, not shown, on the PMD layer 192, with a copper fill metal in the interconnect trench on the barrier liner. The core NMOS source interconnect 196a and the I/O NMOS source interconnect 196e are parts of the ground network 110. The core PMOS source interconnect 196c is part of the core bias interconnect network 106. The I/O PMOS source interconnect 196g is part of the I/O bias interconnect network 116.

Figure 3:
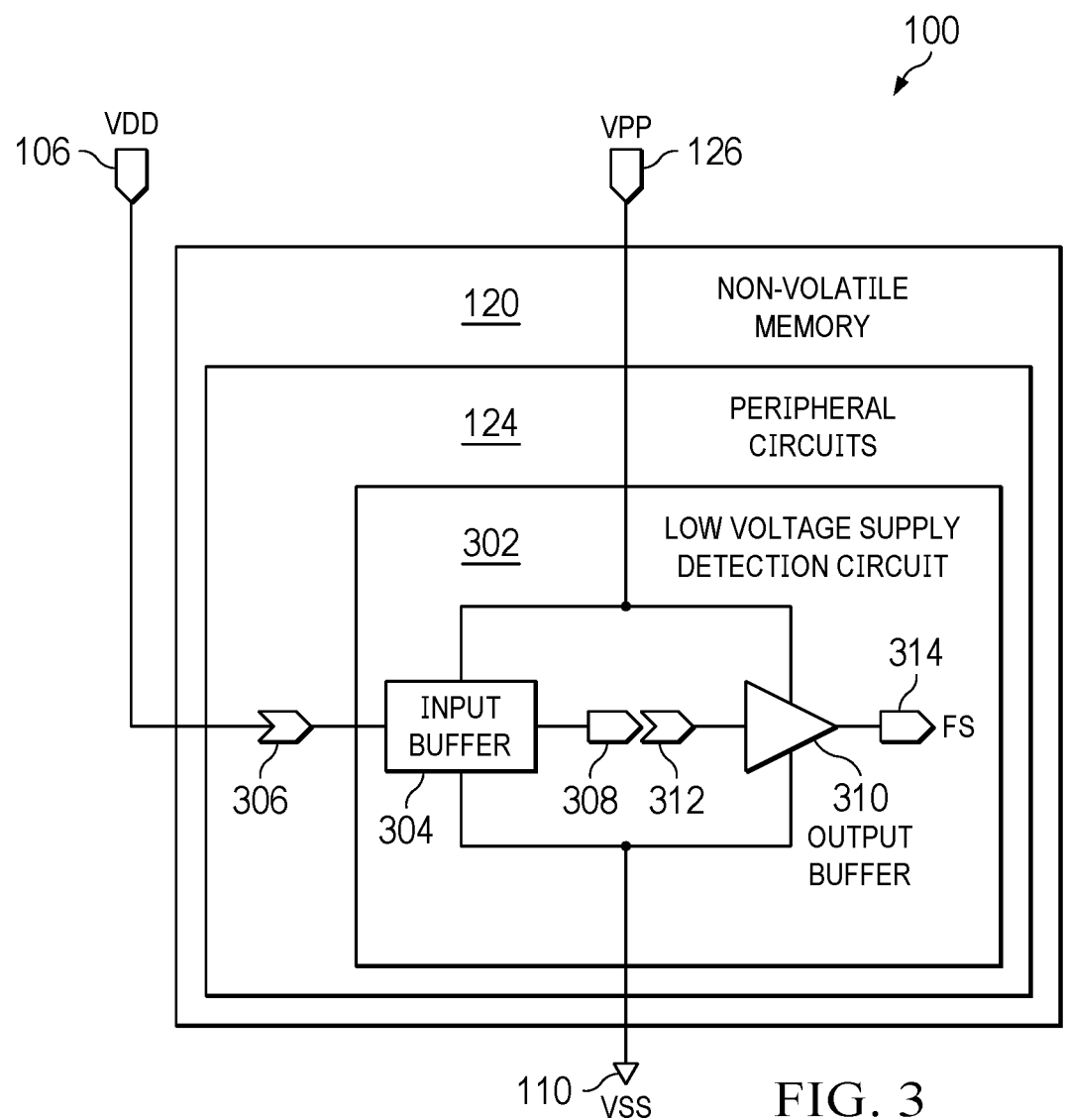
FIG. 3 is a conceptual diagram of an example low voltage supply detection circuit of the peripheral circuits of FIG. 1 in the semiconductor device.

FIG. 3 is a conceptual diagram of an example low voltage supply detection circuit of the peripheral circuits 124 of FIG. 1 in the semiconductor device 100. The low voltage supply detection circuit 302 is coupled between the memory bias interconnect network 126 and the ground network 110.

The low voltage supply detection circuit 302 includes an input buffer 304 coupled between the memory bias interconnect network 126 and the ground network 110. The input buffer 304 has an input buffer input node 306 coupled to the core bias interconnect network 106. A threshold potential of the input buffer 304 at the input buffer input node 306 is less than the core bias potential. The input buffer 304 has an input buffer output node 308.

The low voltage supply detection circuit 302 includes an output buffer 310 coupled between the memory bias interconnect network 126 and the ground network 110. The output buffer has an output buffer input node 312 coupled to the input buffer output node 308 of the input buffer 304. The output buffer 310 has an output buffer output buffer output node 314, labeled "FS" in FIG. 3 for "Fail Safe". The output buffer 310 is configured to provide an output signal, referred to as a Fail Safe signal, at the output buffer output node 314.

The output buffer 310 is configured to provide the Fail Safe signal equal to a potential on the memory bias interconnect network 126 when a potential on the input buffer input node 306 of the input buffer 304 is less than a functional voltage, e.g. Less than 1 volt, such as the ground potential. The output buffer 310 is further configured to provide the Fail Safe signal equal to the ground potential when the potential on the input buffer input node 306 of the input buffer 304 is equal to the core bias potential. The Fail Safe signal, as a function of the potential on the input buffer input node 306 of the input buffer 304 and the potential on the memory bias interconnect network 126 may be summarized in Table 1. The Fail Safe signal may be used by a level shifter, such as the level shifter of FIG. 7, to prevent unintended data alteration in the memory cells 122 of FIG. 1 in an event in which the potential on the memory bias interconnect network 126 is at the memory program bias potential while the potential on the core bias interconnect network 106 is at the ground potential.

TABLE 1

| Potential on the input buffer input node of the input buffer | Potential on the memory bias interconnect network | Output signal |
| --- | --- | --- |
| Ground potential | Ground potential | Ground potential |
| Ground potential | Memory program bias potential | Memory program bias potential |
| Core bias potential | Core bias potential | Ground potential |
| Core bias potential | Memory program bias potential | Ground potential |

Figure 4:
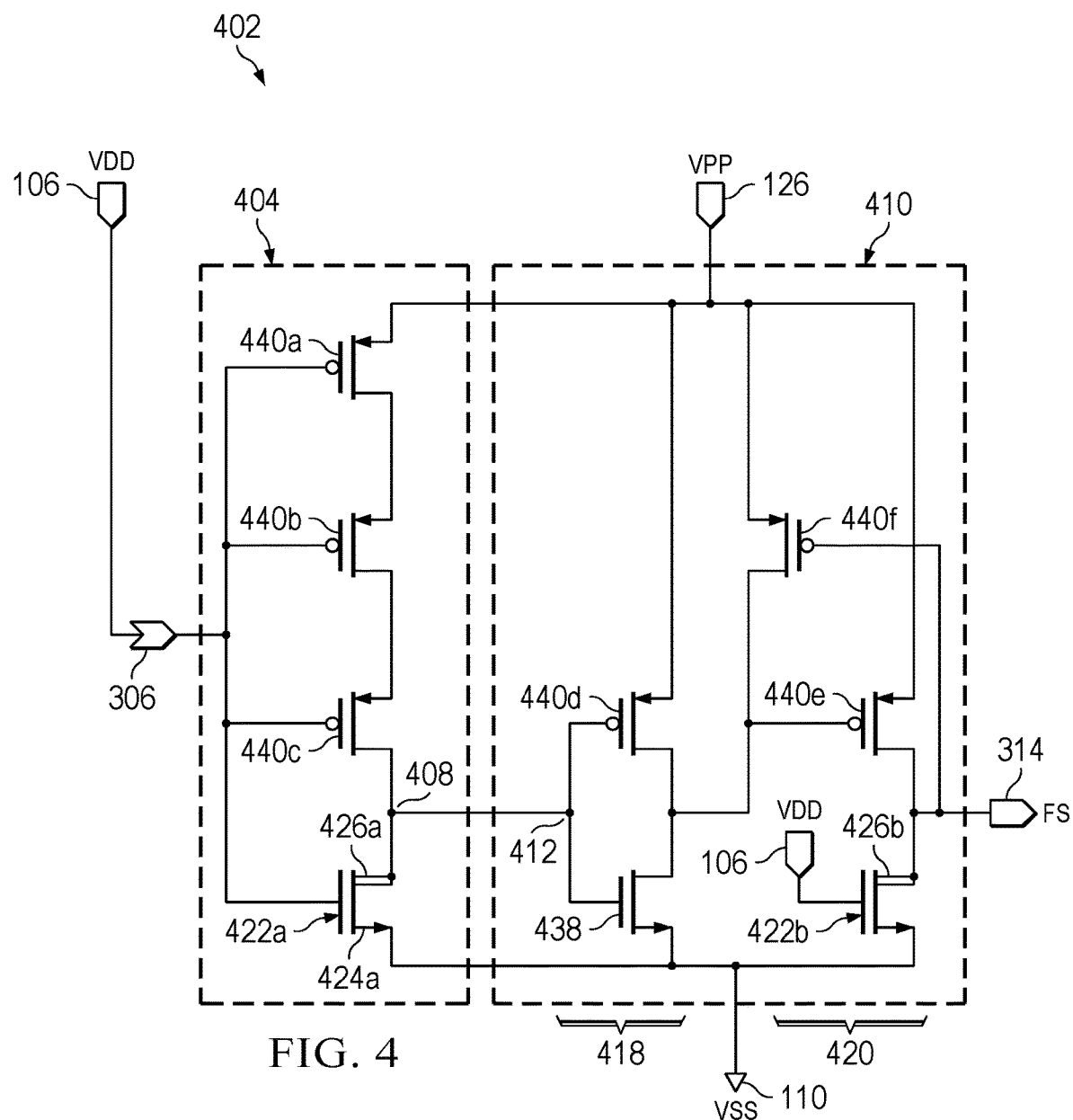
FIG. 4 is a schematic of an example implementation of the low voltage supply detection circuit of FIG. 3.

FIG. 4 is a schematic of an example implementation of the low voltage supply detection circuit 302 of FIG. 3. The low voltage supply detection circuit 402 of this example includes an input buffer 404 corresponding to the input buffer 304 of FIG. 3, and an output buffer 410 corresponding to the output buffer 310 of FIG. 3.

The input buffer 404 includes a plurality of input pull-up transistors 440a, 440b, and 440c, implemented as I/O PMOS transistors 440a, 440b, and 440c, coupled in series to the memory bias interconnect network 126. In another version of this example, the input buffer 404 may include two I/O PMOS transistors 440a and 440b coupled in series to the memory bias interconnect network 126. In a further version of this example, the input buffer 404 may include four or more I/O PMOS transistors coupled in series to the memory bias interconnect network 126. Gates of the plurality of I/O PMOS transistors 440a, 440b, and 440c are coupled in parallel to the input buffer input node 306 of the input buffer 404. The input buffer input node 306 of the input buffer 404 is coupled to the core bias interconnect network 106.

The input buffer 404 of this example includes an input pull-down transistor 422a, implemented as a first core drain extended NMOS transistor 422a, coupled between the ground network 110 and the plurality of I/O PMOS transistors 440a, 440b, and 440c. A source 424a of the first core drain extended NMOS transistor 422a is coupled to the ground network 110. A drain 426a of the first core drain extended NMOS transistor 422a has an extended drain drift region. The drain 426a is coupled to the plurality of I/O PMOS transistors 440a, 440b, and 440c. A gate of the first core drain extended NMOS transistor 422a is coupled to the input buffer input node 306 of the input buffer 404. The first core drain extended NMOS transistor 422a has a threshold potential less than the core bias potential. An input buffer output node 408 of the input buffer 404 is coupled to the drain 426a of the first core drain extended NMOS transistor 422a and to the plurality of I/O PMOS transistors 440a, 440b, and 440c.

The output buffer 410 of this example includes a first stage 418 and a second stage 420. The first stage 418 includes a first stage pull-up transistor 440d, implemented as a fourth I/O PMOS transistor 440d, coupled to the memory bias interconnect network 126, and a first stage pull-down transistor 438, implemented as an I/O NMOS transistor 438, coupled between the fourth I/O PMOS transistor 440d and the ground network 110. Gates of the fourth I/O PMOS transistor 440d and the I/O NMOS transistor 438 are coupled to an output buffer input node 412 of the output buffer 410, which is coupled to the input buffer output node 408 of the input buffer 404.

The second stage 420 includes an output pull-up transistor 440e, implemented as a fifth I/O PMOS transistor 440e, coupled to the memory bias interconnect network 126, and an output pull-down transistor 422b, implemented as a second core drain extended NMOS transistor 422b, coupled between the ground network 110 and the fifth I/O PMOS transistor 440e. A drain 426b of the second core drain extended NMOS transistor 422b is coupled to a drain of the fifth I/O PMOS transistor 440e. A gate of the second core drain extended NMOS transistor 422b is coupled to the core bias interconnect network 106. A gate of the fifth I/O PMOS transistor 440e is coupled to a drain of the fourth I/O PMOS transistor 440d and to a drain of the I/O NMOS transistor 438. The output buffer output node 314 of the output buffer 410 is coupled to the drain of the fifth I/O PMOS transistor 440e and to the drain 426b of the second core drain extended NMOS transistor 422b. The second stage 420 further includes a charge assist transistor 440f, implemented as a sixth I/O PMOS transistor 440f, coupled between the memory bias interconnect network 126 and the gate of the fifth I/O PMOS transistor 440e. A gate of the sixth I/O PMOS transistor 440f is coupled to the output buffer output node 314 of the output buffer 410. The sixth I/O PMOS transistor 440f may provide a pre-charge assist function for the gate of the fifth I/O PMOS transistor 440e.

During operation of the low voltage supply detection circuit 402, the core bias interconnect network 106 may be at the ground potential while the memory bias interconnect network 126 may be at the memory program bias potential. Such a condition may occur during power up of the semiconductor device 100 of FIG. 1. During this condition, the first core drain extended NMOS transistor 422a is turned off, while the plurality of I/O PMOS transistors 440a, 440b, and 440c are turned on, bringing a potential on the input buffer output node 408 of the input buffer 404, and on the output buffer input node 412 of the output buffer 410, above a threshold potentials of the I/O NMOS transistor 438 in the first stage 418 of the output buffer 410. The I/O NMOS transistor 438 is turned on, while the fourth I/O PMOS transistor 440d is turned off, by the potential on the output buffer input node 412 of the output buffer 410, causing a potential on the drains of the I/O NMOS transistor 438 and the fourth I/O PMOS transistor 440d to go to the ground potential. The ground potential on the core bias interconnect network 106, coupled to the gate of the second core drain extended NMOS transistor 422b, turns the second core drain extended NMOS transistor 422b off. The ground potential on the drains of the I/O NMOS transistor 438 and the fourth I/O PMOS transistor 440d, coupled to the gate of the fifth I/O PMOS transistor 440e, turns on the fifth I/O PMOS transistor 440e, bringing the Fail Safe signal on the output buffer output node 314 of the output buffer 410 to the memory program bias potential on the memory bias interconnect network 126.

During operation of the low voltage supply detection circuit 402, the core bias interconnect network 106 may be at the core bias potential while the memory bias interconnect network 126 may be at the memory program bias potential or at the core bias potential. Such a condition may occur during programming the memory cells 122 or reading the memory cells 122 of FIG. 1, respectively. The core bias potential on the core bias interconnect network 106 turns on the first core drain extended NMOS transistor 422a and the second core drain extended NMOS transistor 422b, because the threshold potentials of the core drain extended NMOS transistors 422a and 422b are advantageously less than the core bias potential. Turning on the core drain extended NMOS transistors 422a and 422b causes the Fail Safe signal on the output buffer output node 314 of the output buffer 410 to fall to the ground potential. The first core drain extended NMOS transistor 422a and the second core drain extended NMOS transistor 422b may advantageously provide sufficient drain-source operating potential to have acceptable off state currents when the memory program bias potential is applied to the memory bias interconnect network 126. Examples of core drain extended NMOS transistors are shown in FIG. 10 through FIG. 13.

Figure 5:
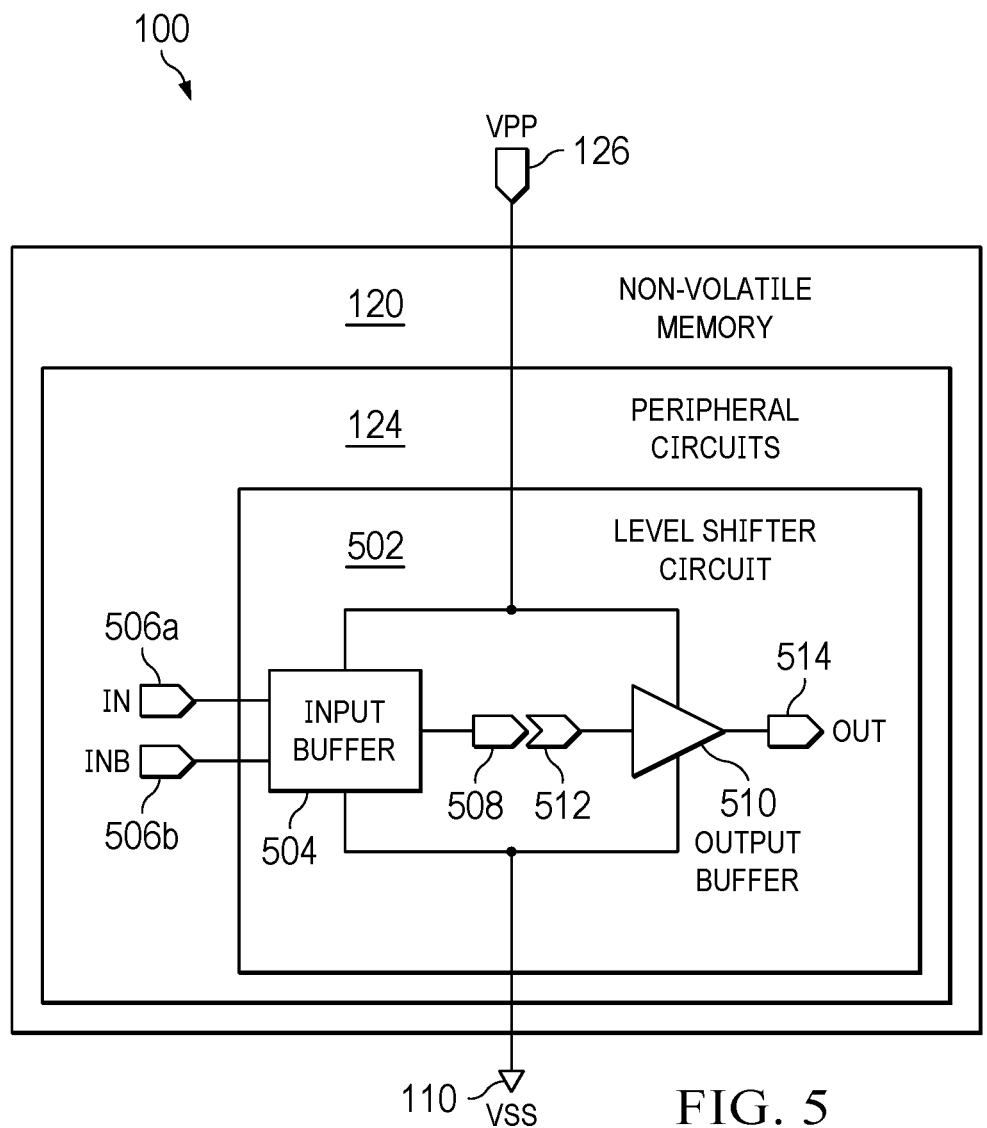
FIG. 5 is a conceptual diagram of an example level shifter circuit of the peripheral circuits of FIG. 1 in the semiconductor device.

FIG. 5 is a conceptual diagram of an example level shifter circuit of the peripheral circuits 124 of FIG. 1 in the semiconductor device 100. The level shifter circuit 502 is coupled between the memory bias interconnect network 126 and the ground network 110.

The level shifter circuit 502 includes an input buffer 504 coupled between the memory bias interconnect network 126 and the ground network 110. The input buffer 504 has a first input buffer input node 506a and a second input buffer input node 506b. A first threshold potential of the input buffer 504 at the first input buffer input node 506a is less than the core bias potential, and a second threshold potential of the input buffer 504 at the second input buffer input node 506b is less than the core bias potential. The input buffer 504 has an input buffer output node 508. The input buffer 504 is configured to operate when a first input signal at the first input buffer input node 506a is complementary to a second input signal at the second input buffer input node 506b, that is, when the first potential is at the ground potential while the second potential is at the core bias potential, and vice versa. The peripheral circuits 124 are configured to provide the first input signal and the second input signal, ranging from the ground potential to the core bias potential.

The level shifter circuit 502 includes an output buffer 510 coupled between the memory bias interconnect network 126 and the ground network 110. The output buffer has an output buffer input node 512 coupled to the input buffer output node 508 of the input buffer 504. The output buffer 510 has an output buffer output node 514. The output buffer 510 is configured to provide an output signal at the output buffer output node 514.

The output buffer 510 is configured to provide the output signal equal to a potential on the memory bias interconnect network 126 when the first potential on the first input buffer input node 506a of the input buffer 504 is equal to the core bias potential while the second potential on the second input buffer input node 506b of the input buffer 504 is equal to the ground potential. In this case, the output signal may be used to program the memory cells 122 when the potential on the memory bias interconnect network 126 is at the memory program bias potential, and may be used to read the memory cells 122 when the potential on the memory bias interconnect network 126 is at the core bias potential. The output buffer 510 is further configured to provide the output signal equal to the ground potential when the first potential on the first input buffer input node 506a of the input buffer 504 is equal to the ground potential while the second potential on the second input buffer input node 506b of the input buffer 504 is equal to the core bias potential. In this case, programming and reading the memory cells 122 may be suspended. The output signal at the output buffer output node 514, as a function of the first potential on the first input buffer input node 506a of the input buffer 504 and the potential on the memory bias interconnect network 126 may be summarized in Table 2.

TABLE 2

| Potential on the first input buffer input node of the input buffer | Potential on the memory bias interconnect network | Output signal |
|---|---|---|
| Ground potential | Core bias potential | Ground potential |
| Ground potential | Memory program bias potential | Ground potential |
| Core bias potential | Core bias potential | Core bias potential |
| Core bias potential | Memory program bias potential | Memory program bias potential |

Figure 6:
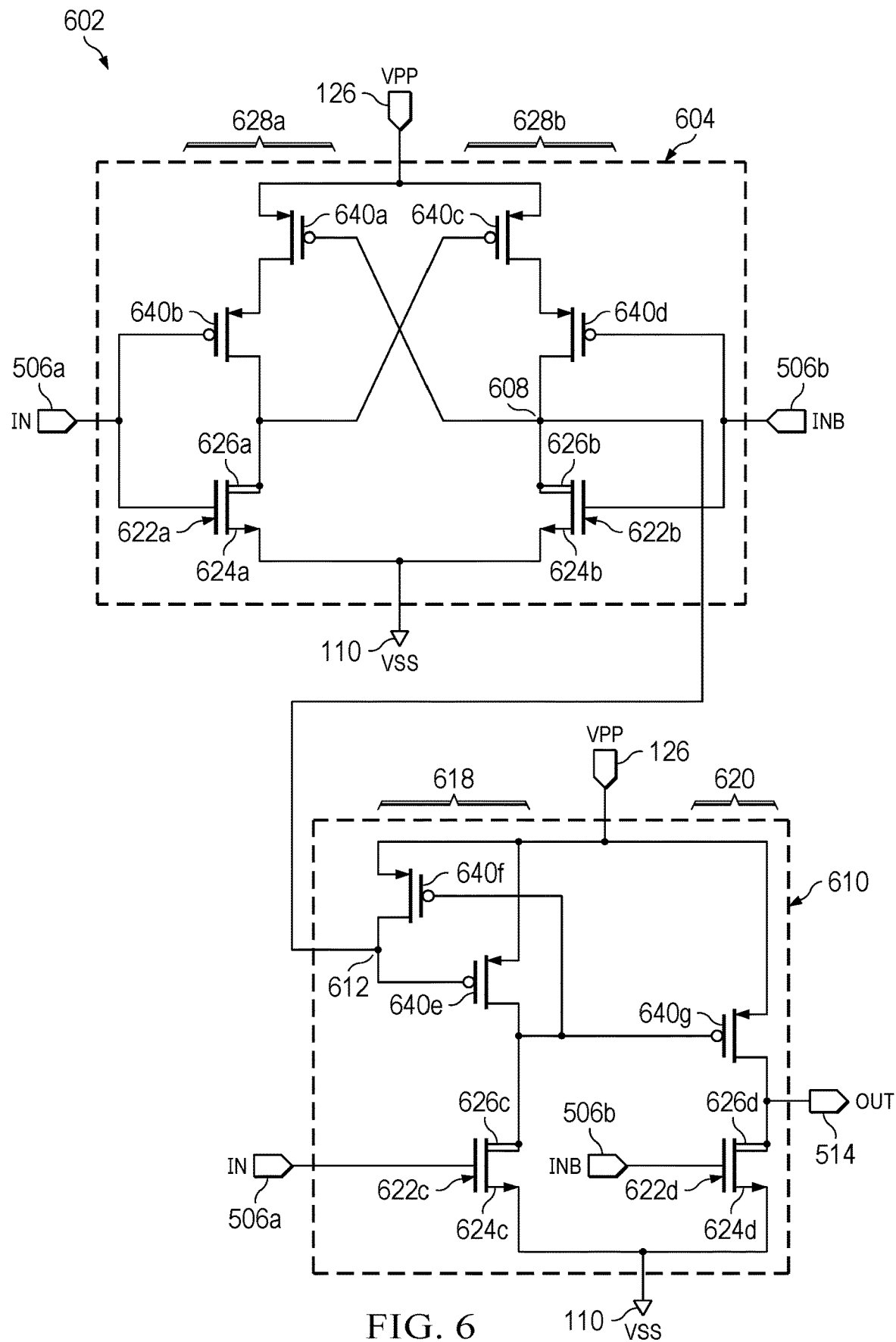
FIG. 6 is a schematic of an example implementation of the level shifter circuit of FIG. 5.

FIG. 6 is a schematic of an example implementation of the level shifter circuit 502 of FIG. 5. The level shifter circuit 602 of this example includes an input buffer 604 corresponding to the input buffer 504 of FIG. 5, and an output buffer 610 corresponding to the output buffer 510 of FIG. 5.

The input buffer 604 of this example includes a cross-coupled dual inverter latch with first and second input pull-up transistors 640a and 640b, implemented as first and second I/O PMOS transistors 640a and 640b, and a first input pull-down transistor 622*a*, implemented as a first core drain extended NMOS transistor 622*a*, in a first inverter 628*a*, and third and fourth input pull-up transistors 640*c* and 640*d*, implemented as third and fourth I/O PMOS transistors 640*c* and 640*d*, and a second input pull-down transistor 622*b*, implemented as a second core drain extended NMOS transistor 622*b*, in a second inverter 628*b*. The first and second I/O PMOS transistors 640*a* and 640*b* are coupled in series, and the third and fourth I/O PMOS transistors 640*c* and 640*d* are coupled in series. Sources of the first I/O PMOS transistor 640*a* and the third I/O PMOS transistor 640*c* are coupled to the memory bias interconnect network 126. A drain of the second I/O PMOS transistor 640*b* is coupled to a drain 626*a* of the first core drain extended NMOS transistor 622*a*. Similarly, a drain of the fourth I/O PMOS transistor 640*d* is coupled to a drain 626*b* of the second core drain extended NMOS transistor 622*b*. A source 624*a* of the first core drain extended NMOS transistor 622*a* and a source 624*b* of the second core drain extended NMOS transistor 622*b* are coupled to the ground network 110. The drains of the second I/O PMOS transistor 640*a* and the first core drain extended NMOS transistor 622*a* are coupled to a gate of the third I/O PMOS transistor 640*c*, and the drains of the fourth I/O PMOS transistor 640*d* and the second core drain extended NMOS transistor 622*b* are coupled to a gate of the first I/O PMOS transistor 640*a*, to provide a cross-coupled configuration of the first inverter 628*a* and the second inverter 628*b*. The first input buffer input node 506*a* is coupled to gates of the second I/O PMOS transistor 640*b* and the first core drain extended NMOS transistor 622*a*. The second input buffer input node 506*b* is coupled to gates of the fourth I/O PMOS transistor 640*d* and the second core drain extended NMOS transistor 622*b*. The drains of the fourth I/O PMOS transistor 640*d* and the second core drain extended NMOS transistor 622*b* are coupled to an input buffer output node 608 of the input buffer 604.

The output buffer 610 of this example includes a first stage 618 and a second stage 620. The first stage 618 includes a first stage pull-up transistor 640*e*, implemented as a fifth I/O PMOS transistor 640*e*, coupled to the memory bias interconnect network 126, and a first stage pull-down transistor 622*c*, implemented as a third core drain extended NMOS transistor 622*c*, coupled between the fifth I/O PMOS transistor 640*e* and the ground network 110. A drain 626*c* of the third core drain extended NMOS transistor 622*c* is coupled to a drain of the fifth I/O PMOS transistor 640*e*. A source 624*c* of the third core drain extended NMOS transistor 622*c* is coupled to the ground network 110. A gate of the fifth I/O PMOS transistor 640*e* is coupled to an output buffer input node 612 of the output buffer 610, which is coupled to the input buffer output node 608 of the input buffer 604. A gate of third core drain extended NMOS transistor 622*c* is coupled to the first input buffer input node 506*a*. The first stage 618 further includes a charge assist transistor 640*f*, implemented as a sixth I/O PMOS transistor 640*f*, coupled between the memory bias interconnect network 126 and the output buffer input node 612 of the output buffer 610. A gate of the sixth I/O PMOS transistor 640*f* is coupled to the drain of the fifth I/O PMOS transistor 640*e* and the drain 626*c* of the third core drain extended NMOS transistor 622*c*. The sixth I/O PMOS transistor 640*f* may advantageously assist charging up the gate of the fifth I/O PMOS transistor 640*e* when the first input buffer input node 506*a* transitions from the ground potential to the core bias potential, limiting a dynamic current component through the third core drain extended NMOS transistor 622*c*, and improving a transient response of the first stage 618.

The second stage 620 includes an output pull-up transistor 640*g*, implemented as a seventh I/O PMOS transistor 640*g*, coupled to the memory bias interconnect network 126, and an output pull-down transistor 622*d*, implemented as a fourth core drain extended NMOS transistor 622*d*, coupled between the ground network 110 and the seventh I/O PMOS transistor 640*f*. A drain 626*d* of the fourth core drain extended NMOS transistor 622*d* is coupled to a seventh I/O PMOS transistor 640*g*. A source 624*d* of the fourth core drain extended NMOS transistor 622*d* is coupled to the ground network 110. A gate of the fourth core drain extended NMOS transistor 622*d* is coupled to the second input buffer input node 506*b*. A gate of the seventh I/O PMOS transistor 640*g* is coupled to the drain of the fifth I/O PMOS transistor 640*e* and to the drain 626*d* of the fourth core drain extended NMOS transistor 622*d*. The output buffer output node 514 of the output buffer 610 is coupled to the drain of the seventh I/O PMOS transistor 640*g* and to the drain 626*d* of the fourth core drain extended NMOS transistor 622*d*.

During operation of the level shifter circuit 602, the memory bias interconnect network 126 may be at the memory program bias potential for programming the memory cells 122, or may be at the core bias potential for reading the memory cells 122. In a first case, the first input buffer input node 506*a* may be at the core bias potential while the second input buffer input node 506*b* is at the ground potential, so that the level shifter circuit 602 provides the potential on the memory bias interconnect network 126 at the output buffer output node 514. In this first case, the core bias potential at the first input buffer input node 506*a* turns on the first core drain extended NMOS transistor 622*a* and turns off the second I/O PMOS transistor 640*b*, bringing the gate of the third I/O PMOS transistor 640*c* to the ground potential, thus turning on the third I/O PMOS transistor 640*c*. At the same time, the ground potential at the second input buffer input node 506*b* turns off the second core drain extended NMOS transistor 622*b* and turns on the fourth I/O PMOS transistor 640*d*, bringing the gate of the first I/O PMOS transistor 640*a* to the potential on the memory bias interconnect network 126, thus turning off the first I/O PMOS transistor 640*a*. The input buffer output node 608 of the input buffer 604, being coupled to the drain 626*b* of the second core drain extended NMOS transistor 622*b*, transitions from the ground potential toward the potential on the memory bias interconnect network 126.

The output buffer input node 612 of the output buffer 610, being coupled to the input buffer output node 608 of the input buffer 604, rises above a threshold potential of the fifth I/O PMOS transistor 640*e*. Increasing a resistance of the fifth I/O PMOS transistor 640*e*. The core bias potential at the first input buffer input node 506*a* turns on the third core drain extended NMOS transistor 622*c*, bringing the drain 626*c* of the third core drain extended NMOS transistor 622*c* to the ground potential. The ground potential at the drain 626*c* of the third core drain extended NMOS transistor 622*c* turns on the sixth I/O PMOS transistor 640*f*, further increasing the transition of the potential on the output buffer input node 612 of the output buffer 610 toward the potential on the memory bias interconnect network 126. The ground potential at the second input buffer input node 506*b* turns off the fourth core drain extended NMOS transistor 622*d*. The gate of the seventh I/O PMOS transistor 640*g*, being connected to the drain 626*c* of the third core drain extended NMOS transistor 622*c*, is brought to the ground potential, turning on the seventh I/O PMOS transistor 640*g*, bringing the output buffer output node 514 of the output buffer 610 to the potential on the memory bias interconnect network 126.

In a second case, the first input buffer input node 506a may be at the ground potential while the second input buffer input node 506b is at the core bias potential, so that the level shifter circuit 602 provides the ground potential at the output buffer output node 514. In this second case, the core bias potential at the second input buffer input node 506b turns on the second core drain extended NMOS transistor 622b and turns off the fourth I/O PMOS transistor 640d, bringing the gate of the first I/O PMOS transistor 640a to the ground potential, thus turning on the first I/O PMOS transistor 640a. At the same time, the ground potential at the first input buffer input node 506a turns off the first core drain extended NMOS transistor 622a and turns on the second I/O PMOS transistor 640b, bringing the gate of the third I/O PMOS transistor 640c to the potential on the memory bias interconnect network 126, thus turning off the third I/O PMOS transistor 640c. The input buffer output node 608 of the input buffer 604, being coupled to the drain 626b of the second core drain extended NMOS transistor 622b, transitions from the potential on the memory bias interconnect network 126 toward the ground potential.

The output buffer input node 612 of the output buffer 610, being coupled to the input buffer output node 608 of the input buffer 604, falls below a threshold potential of the fifth I/O PMOS transistor 640e. Turning off the fifth I/O PMOS transistor 640e. The ground potential at the first input buffer input node 506a turns off the third core drain extended NMOS transistor 622c, bringing the drain 626c of the third core drain extended NMOS transistor 622c to the potential on the memory bias interconnect network 126. The potential on the memory bias interconnect network 126 at the drain 626c of the third core drain extended NMOS transistor 622c turns off the sixth I/O PMOS transistor 640f. The potential on the memory bias interconnect network 126 at the second input buffer input node 506b turns on the fourth core drain extended NMOS transistor 622d. The gate of the seventh I/O PMOS transistor 640g, being connected to the drain 626c of the third core drain extended NMOS transistor 622c, is brought to the potential on the memory bias interconnect network 126, turning off the seventh I/O PMOS transistor 640g, bringing the output buffer output node 514 of the output buffer 610 to the ground potential. The first through fourth core drain extended NMOS transistors 622a through 622d may advantageously provide sufficient drain-source operating potential to have acceptable off state currents when the memory program bias potential is applied to the memory bias interconnect network 126.

Figure 7:
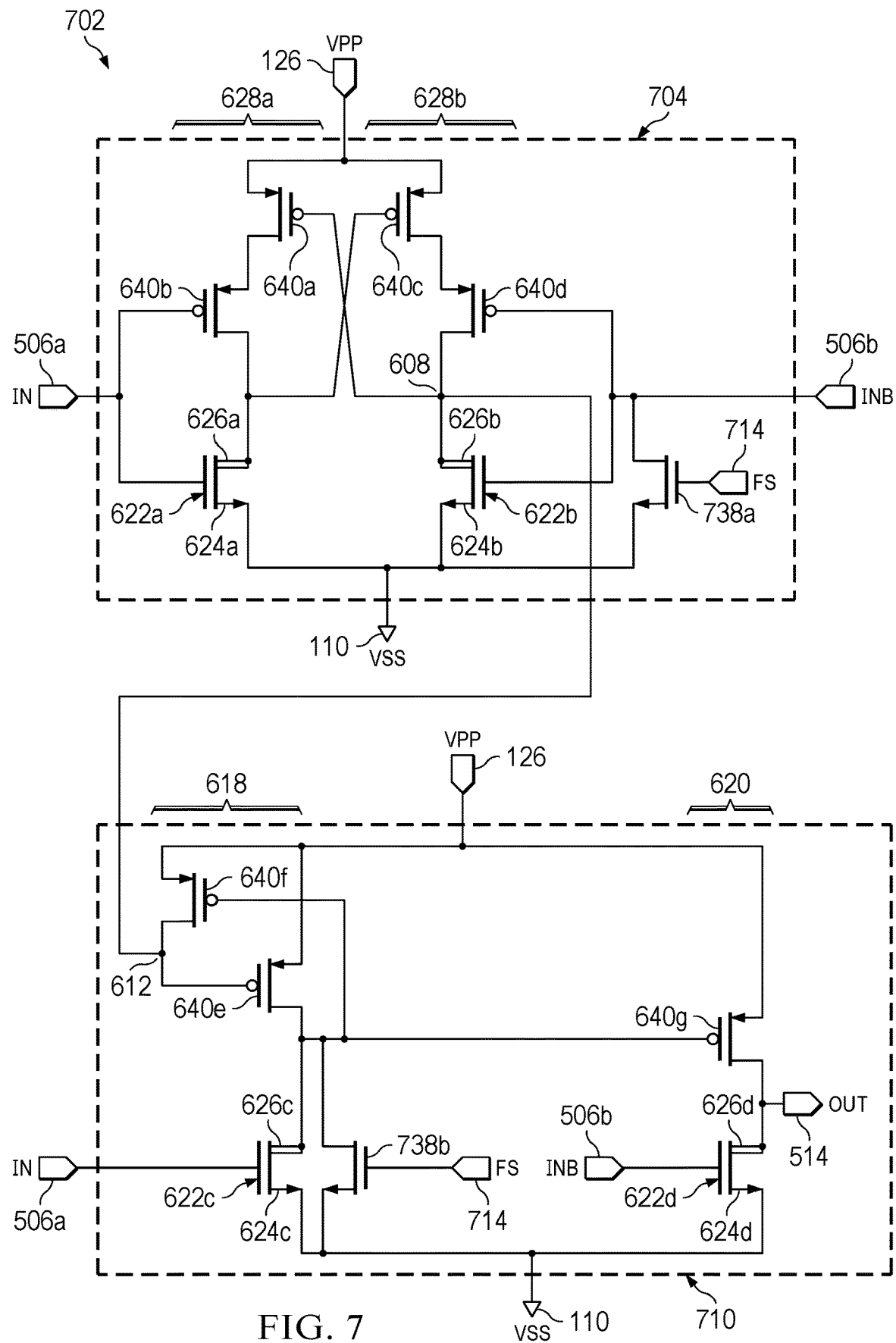
FIG. 7 is a schematic of another example implementation of the level shifter circuit of FIG. 5.

FIG. 7 is a schematic of another example implementation of the level shifter circuit 502 of FIG. 5. The level shifter circuit 702 of this example includes an input buffer 704 corresponding to the input buffer 504 of FIG. 5. The input buffer 704 of this example may include the components and circuitry of the input buffer 704 of FIG. 6, as depicted in FIG. 7. The level shifter circuit 702 of this example includes an output buffer 710 corresponding to the output buffer 510 of FIG. 5. The output buffer 710 of this example may include the components and circuitry of the output buffer 710 of FIG. 6, as depicted in FIG. 7.

The input buffer 704 includes a first pull-down transistor 738a coupled between the second input buffer input node 506b and the ground network 110. The first pull-down transistor 738a may be implemented as a first I/O NMOS transistor 738a, similar to the I/O NMOS transistor 138 of FIG. 2. A gate of the first pull-down transistor 738a is coupled to a fail safe node 714, such as the output buffer output node 314 of the low voltage supply detection circuit 302 of FIG. 3. The fail safe node 714 has a potential above a threshold potential of the first pull-down transistor 738a when the core bias interconnect network 106 of FIG. 1 is at the ground potential, and the memory bias interconnect network 126 is at the memory program bias potential. In such a situation, the potential on the fail safe node 714 turns on the first pull-down transistor 738a, bringing the second input buffer input node 506b to the ground potential, providing a potential at the input buffer output node 608 of the input buffer 704, and the output buffer input node 612 of the output buffer 710, that will turn off the fifth I/O PMOS transistor 640e in the first stage 618 of the output buffer 710.

The output buffer 710 includes a second pull-down transistor 738b which couples the drain of the fifth I/O PMOS transistor 640e and the drain 626c of the third core drain extended NMOS transistor 622c to the ground network 110. The second pull-down transistor 738b may be implemented as a second I/O NMOS transistor 738b, similar to the I/O NMOS transistor 138. A gate of the second pull-down transistor 738b is coupled to the fail safe node 714. In the situation in which the core bias interconnect network 106 is at the ground potential, and the memory bias interconnect network 126 is at the memory program bias potential, the potential at the fail safe node 714 turns on the second pull-down transistor 738b, bringing the gate of the seventh I/O PMOS transistor 640g to the ground potential. Having the ground potential on the gate of the seventh I/O PMOS transistor 640g causes the seventh I/O PMOS transistor 640g to turn on, bringing the output buffer output node 514 of the output buffer 710 to the memory program bias potential on the memory bias interconnect network 126, reducing a risk of unintentionally altering data in the memory cells 122 of FIG. 1.

The first pull-down transistor 738a and the second pull-down transistor 738b may provide a more reliable configuration for providing the memory program bias potential at the output buffer output node 514 of the output buffer 710 in the situation in which the core bias interconnect network 106 is at the ground potential, and the memory bias interconnect network 126 is at the memory program bias potential. Implementing the first pull-down transistor 738a and the second pull-down transistor 738b as instances of the I/O NMOS transistor 138 may reduce fabrication cost and complexity compared to using more complex transistors requiring additional fabrication steps.

Figure 8:
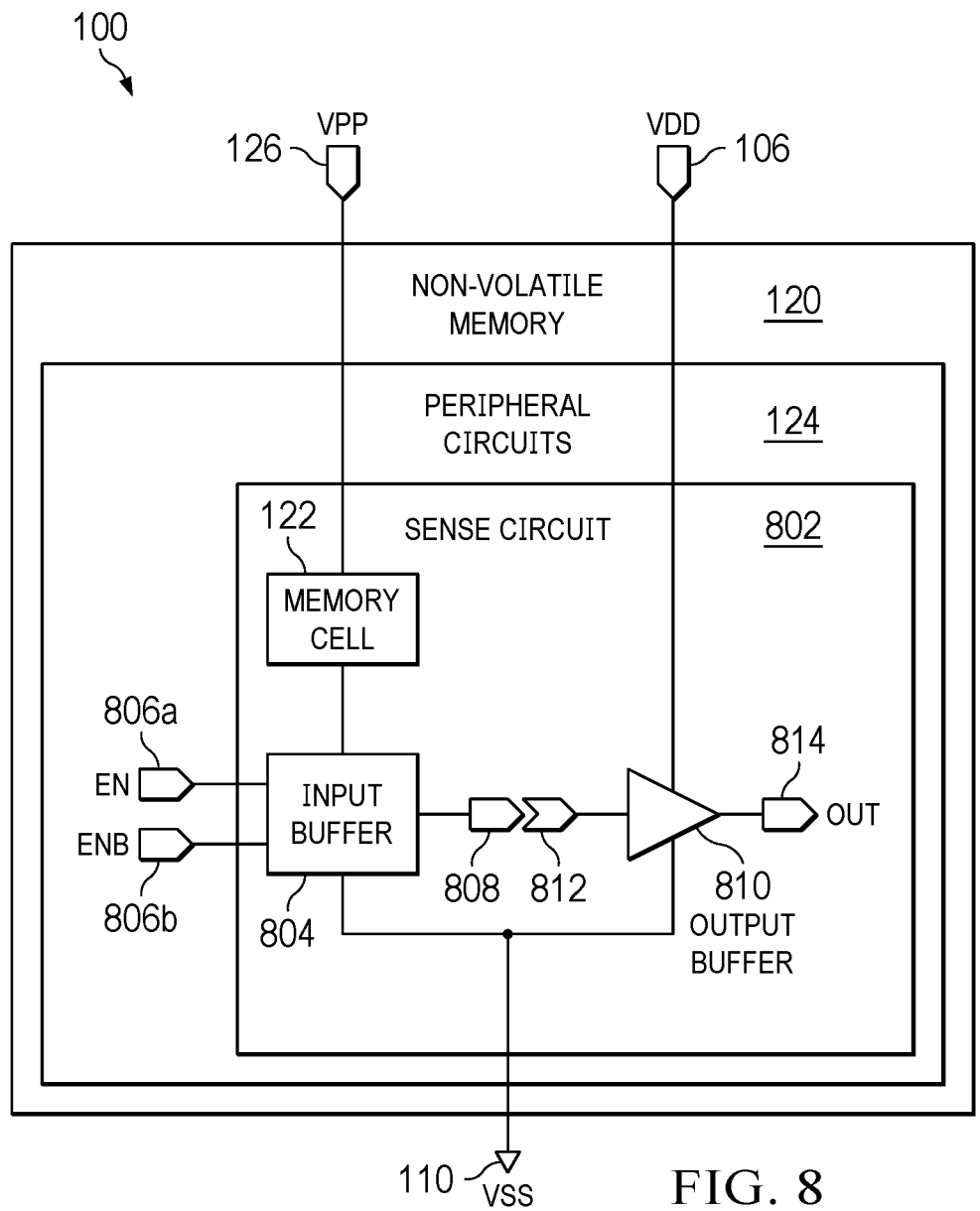
FIG. 8 is a conceptual diagram of an example sense circuit of the peripheral circuits of FIG. 1 in the semiconductor device.

FIG. 8 is a conceptual diagram of an example sense circuit of the peripheral circuits 124 of FIG. 1 in the semiconductor device 100. The sense circuit 802 includes an input buffer 804 coupled between at least one memory cell 122 and the ground network 110. The memory cell 122 is coupled to the memory bias interconnect network 126. The sense circuit 802 includes an output buffer 810 coupled between the core bias interconnect network 106 and the ground network 110.

The input buffer 804 has a first input buffer input node 806a. The peripheral circuits 124 are configured to provide a first input signal to the first input buffer input node 806a, ranging from the ground potential to the core bias potential. A threshold potential of the input buffer 804 at the first input buffer input node 806a is less than the core bias potential. The input buffer 804 has a second input buffer input node 806b. The peripheral circuits 124 are configured to provide a second input signal to the second input buffer input node 806b, opposite in polarity to the first input signal. In one case, the peripheral circuits 124 are configured to provide the first input signal as the core bias potential and to provide the second input signal as the ground potential. In another case, the peripheral circuits 124 are configured to provide the first input signal as the ground potential and to provide the second input signal as the core bias potential. The input buffer 804 has an input buffer output node 808.

The sense circuit 802 includes an output buffer 810 coupled between the memory bias interconnect network 126 and the ground network 110. The output buffer has an output buffer input node 812 coupled to the input buffer output node 808 of the input buffer 804. The output buffer 810 has an output buffer output node 814. The output buffer 810 is configured to provide an output signal at the output buffer output node 814.

The output buffer 810 is configured to provide a default state of the output signal, for example, equal to the ground potential, when a potential on the output buffer input node 812 is equal to the ground potential. The output buffer 810 is configured to provide a first data state of the output signal. For example, equal to the core bias potential, when the potential on the output buffer input node 812 is equal to the core bias potential and a data current from the memory cell 122 into the input buffer 804 is greater than a memory threshold current. The output buffer 810 is configured to provide a second data state of the output signal. For example, equal to the ground potential, when the potential on the output buffer input node 812 is equal to the core bias potential and the data current from the memory cell 122 into the input buffer 804 is less than a memory threshold current. The output signal, as a function of the potential on the first input buffer input node 806*a* of the input buffer 804 and the data current from the memory cell 122 may be summarized in Table 3. The output signal may be used as an indicator of a data state of the memory cell 122.

TABLE 3

| Potential on the first input buffer input node of the input buffer | Data current from the memory cell | Output signal |
| --- | --- | --- |
| Ground potential | N/A | Ground potential |
| Core bias potential | Greater than memory threshold current | Core bias potential |
| Core bias potential | Less than memory threshold current | Ground potential |

Figure 9:
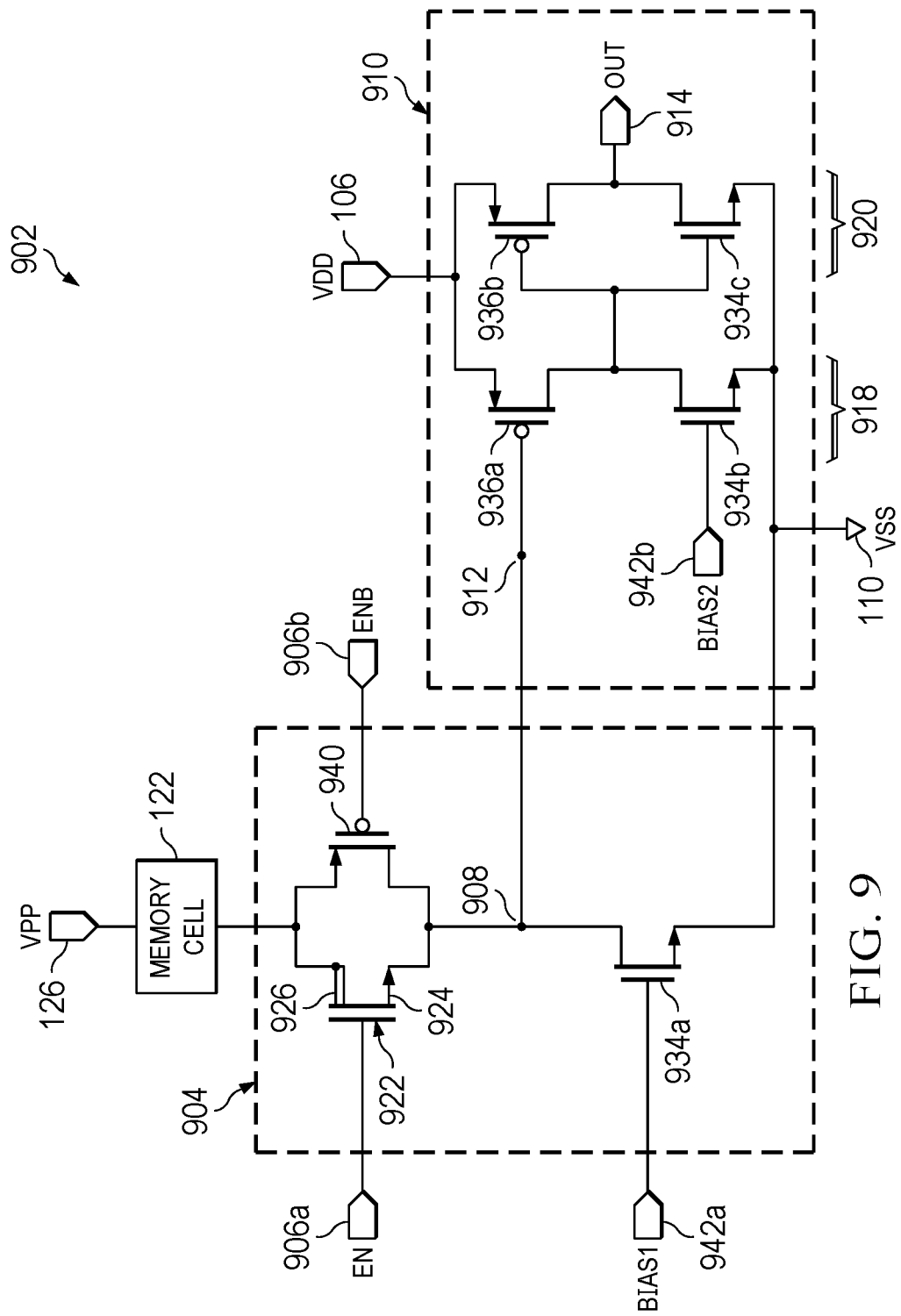
FIG. 9 is a schematic of an example implementation of the sense circuit of FIG. 8.

FIG. 9 is a schematic of an example implementation of the sense circuit 802 of FIG. 8. The sense circuit 902 of this example includes an input buffer 904 corresponding to the input buffer 804 of FIG. 8, and an output buffer 910 corresponding to the output buffer 810 of FIG. 8.

The input buffer 904 includes an n-channel passgate transistor 922, implemented as a core drain extended NMOS transistor 922, coupled in parallel with a p-channel passgate transistor 940, implemented as an I/O PMOS transistor 940. A drain 926 of the core drain extended NMOS transistor 922 and a drain of the I/O PMOS transistor 940 are coupled to the memory cell 122. The input buffer 904 further includes a first load transistor 934*a*, implemented as a first core NMOS transistor 934*a*, that couples the core drain extended NMOS transistor 922 and the I/O PMOS transistor 940 to the ground network 110. A source 924 of the core drain extended NMOS transistor 922 and a drain of the I/O PMOS transistor 940 are coupled to a drain of the first core NMOS transistor 934*a* at an input buffer output node 908 of the input buffer 904. A gate of the core drain extended NMOS transistor 922 is coupled to a first input buffer input node 906*a* of the input buffer 904. A gate of the I/O PMOS transistor 940 is coupled to a second input buffer input node 906*b* of the input buffer 904. The peripheral circuits 124 of FIG. 1 provide a first enable signal and a complementary second enable signal, ranging from the ground potential to the core bias potential, to the first input buffer input node 906*a* and the second input buffer input node 906*b*, respectively. A gate of the first core NMOS transistor 934*a* is coupled to a first bias node 942*a*. The peripheral circuits 124 provide a first bias potential to the first bias node 942*a* that is above a threshold potential of the first core NMOS transistor 934*a*, but less than the core bias potential.

The output buffer 910 of this example includes a first stage 918 and a second stage 920. The first stage 918 includes a first stage driver transistor 936*a*, implemented as a first core PMOS transistor 936*a*, coupled to the core bias interconnect network 106, and a first stage load transistor 934*b*, implemented as a second core NMOS transistor 934*b*, coupled between the first core PMOS transistor 936*a* and the ground network 110. A gate of the first core PMOS transistor 936*a* is coupled to an output buffer input node 912 of the output buffer 910, which is coupled to the input buffer output node 908 of the input buffer 904. A gate of the second core NMOS transistor 934*b* is coupled to a second bias node 942*b*. The peripheral circuits 124 provide a second bias potential to the second bias node 942*b* that is above a threshold potential of the second core NMOS transistor 934*b*, but less than the core bias potential.

The second stage 920 includes a second stage p-channel transistor 936*b*, implemented as a second core PMOS transistor 936*b*, coupled to the core bias interconnect network 106, and a second stage n-channel transistor 934*c*, implemented as a third core NMOS transistor 934*c*, coupled between the ground network 110 and the second core PMOS transistor 936*b*. A drain of the second core PMOS transistor 936*b* and a drain of the third core NMOS transistor 934*c* are coupled to an output buffer output node 914 of the output buffer 910. A gate of the second core PMOS transistor 936*b* and a gate of the third core NMOS transistor 934*c* are coupled to a drain of the first core PMOS transistor 936*a* and to a drain of the second core NMOS transistor 934*b*.

During operation of the sense circuit 902, in a first case, the peripheral circuits 124 may provide the first enable signal, equal to the core bias potential, to the first input buffer input node 906*a*, turning on the core drain extended NMOS transistor 922, and provide the second enable signal, equal to the ground potential, to the second input buffer input node 906*b*, turning on the I/O PMOS transistor 940. A first data current from the memory cell 122, which in this first case is greater than a memory threshold current, flows in parallel through the core drain extended NMOS transistor 922 and the I/O PMOS transistor 940, and flows through the first core NMOS transistor 934*a*. The first data current through the first core NMOS transistor 934*a* generates a first data potential at the input buffer output node 908 of the input buffer 904. The first data potential turns off the first core PMOS transistor 936*a*, bringing the potential at the gates of the second stage 920 close to the ground potential, causing the output buffer 910 to provide an output signal equal to the core bias potential at the output buffer output node 914 of the output buffer 910.

During operation of the sense circuit 902, in a second case, the peripheral circuits 124 may provide the first enable signal, equal to the core bias potential, to the first input buffer input node 906*a*, turning on the core drain extended NMOS transistor 922, and provide the second enable signal, equal to the ground potential, to the second input buffer input node 906*b*, turning on the I/O PMOS transistor 940, as in the first case. A second data current from the memory cell 122, which in this second case is less than a memory threshold current, flows in parallel through the core drain extended NMOS transistor 922 and the I/O PMOS transistor 940, and flows through the first core NMOS transistor 934a. The second data current through the first core NMOS transistor 934a generates a first data potential, lower than the first data potential, at the input buffer output node 908 of the input buffer 904. The first data potential turns on the first core PMOS transistor 936a, bringing the potential at the gates of the second stage 920 close to the core bias potential, causing the output buffer 910 to provide an output signal equal to the ground potential at the output buffer output node 914 of the output buffer 910.

During operation of the sense circuit 902, in a third case, the peripheral circuits 124 may provide the first enable signal, equal to the ground potential, to the first input buffer input node 906a, turning off the core drain extended NMOS transistor 922, and provide the second enable signal, equal to the core bias potential, to the second input buffer input node 906b, turning off the I/O PMOS transistor 940. In this third case, no data current from the memory cell 122 flows through the first core NMOS transistor 934a. The output buffer 910 provides an output signal equal to the ground potential at the output buffer output node 914 of the output buffer 910.

Figure 10:
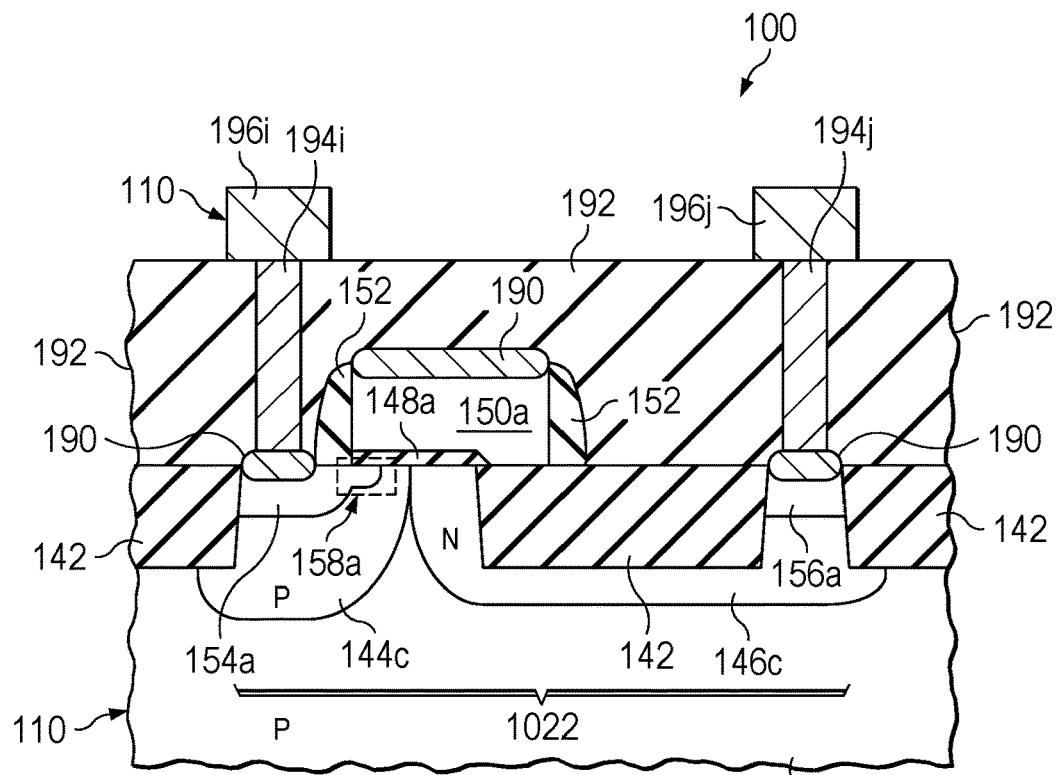
FIG. 10 is a cross section of an example core drain extended NMOS transistor of the semiconductor device of FIG. 1 and FIG. 2.

FIG. 10 is a cross section of an example core drain extended NMOS transistor of the semiconductor device of FIG. 1 and FIG. 2. The core drain extended NMOS transistor 1022 of this example is formed in and on the substrate 102. The substrate 102 may be part of the ground network 110 in this example and in other examples of core drain extended NMOS transistors disclosed in reference to FIG. 11 through FIG. 13. The field relief dielectric layer 142 laterally isolates the core drain extended NMOS transistor 1022. A portion of the field relief dielectric layer 142 extends over an n-type drift region 146c of the core drain extended NMOS transistor 1022. The n-type drift region 146c may be implemented as an n-type well, formed concurrently with the n-type wells 146a and 146b of FIG. 2, advantageously reducing fabrication cost and complexity of the semiconductor device 100.

A p-type well 144c is formed in the substrate 102 adjacent to the n-type drift region 146c, providing a body region for the core drain extended NMOS transistor 1022. The p-type well 144c may be formed concurrently with the p-type wells 144a and 144b of FIG. 2, further reducing fabrication cost and complexity of the semiconductor device 100.

The core drain extended NMOS transistor 1022 includes a thin NMOS gate dielectric layer 148a formed on the substrate 102. The thin NMOS gate dielectric layer 148a may be formed concurrently with the thin NMOS gate dielectric layer 148 of FIG. 2, further reducing fabrication cost and complexity.

The core drain extended NMOS transistor 1022 includes a drain extended NMOS gate 150a formed on the thin NMOS gate dielectric layer 148a. The core drain extended NMOS transistor 1022 may be formed concurrently with the core NMOS gate 150 of FIG. 2. The drain extended NMOS gate 150a extends partway over the portion of the field relief dielectric layer 142 located over the n-type drift region 146c. The n-type drift region 146c extends up to the thin NMOS gate dielectric layer 148a in this example. The sidewall spacers 152 are formed on lateral surfaces of the drain extended NMOS gate 150a, concurrently with the sidewall spacers 152 of FIG. 2.

The core drain extended NMOS transistor 1022 includes a drain extended n-type source 154a formed in the substrate 102, adjacent to the drain extended NMOS gate 150a in the p-type well 144c. The drain extended n-type source 154a may include a drain extended n-type source extension 158a extending partway under the drain extended NMOS gate 150a. The core drain extended NMOS transistor 1022 includes a drain extended n-type drain contact region 156a formed in the n-type drift region 146c, adjacent to the portion of the field relief dielectric layer 142 located over the n-type drift region 146c, opposite from the p-type well 144c. The drain extended n-type source 154a and the drain extended n-type drain contact region 156a may be formed concurrently with the core n-type source 154 and the core n-type drain 156 of FIG. 2, further accruing the noted advantages.

The metal silicide 190 is formed on exposed silicon of the drain extended n-type source 154a, the drain extended n-type drain contact region 156a, and the drain extended NMOS gate 150a. The PMD layer 192 is formed over the core drain extended NMOS transistor 1022. A drain extended NMOS source contact 194i and a drain extended NMOS drain contact 194j are formed through the PMD layer 192, making electrical connections through the metal silicide 190 to the drain extended n-type source 154a and the drain extended n-type drain contact region 156a, respectively. A drain extended NMOS source interconnect 196i and a drain extended NMOS drain interconnect 196j are formed on the PMD layer 192, making electrical connections to the drain extended NMOS source contact 194i and the drain extended NMOS drain contact 194j, respectively. The drain extended NMOS source interconnect 196i may be part of the ground network 110 in some instances of the core drain extended NMOS transistor 1022.

During operation of the semiconductor device 100, the n-type drift region 146c depletes when the drain extended NMOS drain interconnect 196j is biased at the memory program bias potential, reducing an electric field across the thin NMOS gate dielectric layer 148a. The reduced electric field enables the core drain extended NMOS transistor 1022 to maintain an acceptable off state current and to switch on and off reliably. The thin NMOS gate dielectric layer 148a provides a threshold potential for the core drain extended NMOS transistor 1022 that is less than the core bias potential, enabling the peripheral circuits using instances of the core drain extended NMOS transistor 1022 to be operated with signals generated by the core circuits 104 of FIG. 1. The core drain extended NMOS transistor 1022 of this example may be formed concurrently with the core NMOS transistor 134 and the core PMOS transistor 136 of FIG. 2, without adding fabrication cost or complexity.

Figure 11:
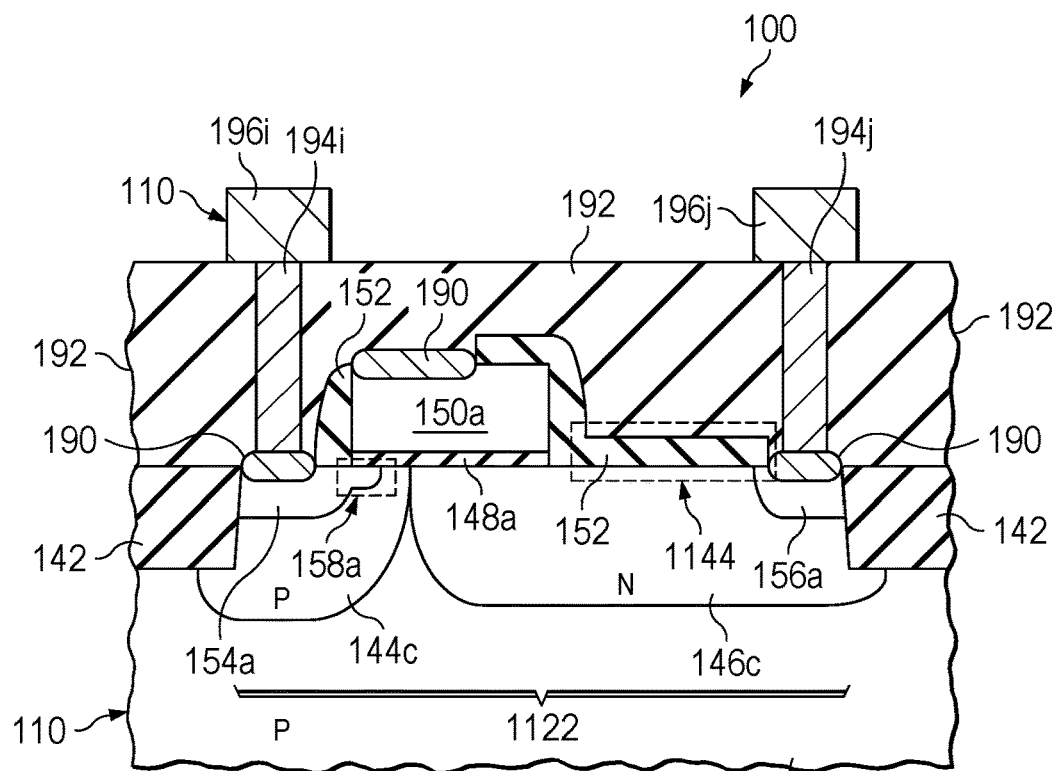
FIG. 11 is a cross section of another example core drain extended NMOS transistor of the semiconductor device of FIG. 1 and FIG. 2.

FIG. 11 is a cross section of another example core drain extended NMOS transistor of the semiconductor device of FIG. 1 and FIG. 2. The core drain extended NMOS transistor 1122 of this example is formed in and on the substrate 102. Elements of the core drain extended NMOS transistor 1122 of this example may be formed concurrently with corresponding elements of the core NMOS transistor 134 of FIG. 2, accruing the noted advantages of reducing fabrication cost and complexity.

NMOS transistor 1122. The core drain extended NMOS transistor 1122 of this example includes an n-type drift region 146c which is implemented as an n-type well. A p-type well 144c is formed in the substrate 102, adjacent to the n-type drift region 146c, providing a body region for the core drain extended NMOS transistor 1122.

A thin NMOS gate dielectric layer 148a of the core drain extended NMOS transistor 1122 is formed on the substrate 102. A drain extended NMOS gate 150a of the core drain extended NMOS transistor 1122 is formed on the thin NMOS gate dielectric layer 148a. The drain extended NMOS gate 150a of this example extends partway over the n-type drift region 146c. The n-type drift region 146c extends up to the thin NMOS gate dielectric layer 148a in this example.

In this example, the sidewall spacers 152 may be patterned to extend past the lateral surfaces of the drain extended NMOS gate 150a to provide a silicide blocking layer 1144 over a portion of the n-type drift region 146c adjacent to the drain extended NMOS gate 150a. The silicide blocking layer 1144 may be formed concurrently with other silicide blocking layers of the semiconductor device, needed for the peripheral circuits 124 or the I/O circuits 114 of FIG. 1. The silicide blocking layer 1144 may advantageously provide a lower resistance for the n-type drift region 146c compared to drift regions with constricted current paths.

A drain extended n-type source 154a of the core drain extended NMOS transistor 1122, with a drain extended n-type source extension 158a, is formed in the substrate 102, adjacent to the drain extended NMOS gate 150a in the p-type well 144c. A drain extended n-type drain contact region 156a of the core drain extended NMOS transistor 1122 is formed in the n-type drift region 146c, adjacent to the silicide blocking layer 1144, opposite from the p-type well 144c.

The metal silicide 190 is formed on exposed silicon, and the PMD layer 192 is formed over the core drain extended NMOS transistor 1122. A drain extended NMOS source contact 194i and a drain extended NMOS drain contact 194j are formed through the PMD layer 192. A drain extended NMOS source interconnect 196i and a drain extended NMOS drain interconnect 196j are formed on the PMD layer 192, as disclosed in reference to FIG. 10. The drain extended NMOS source interconnect 196i may be part of the ground network 110 in some instances of the core drain extended NMOS transistor 1122.

The core drain extended NMOS transistor 1122 of this example may provide the advantages during operation of the semiconductor device 100 disclosed in reference to FIG. 10. In instances of the semiconductor device 100 having silicide blocking layers, the core drain extended NMOS transistor 1122 of this example may be formed without adding fabrication cost or complexity.

Figure 12:
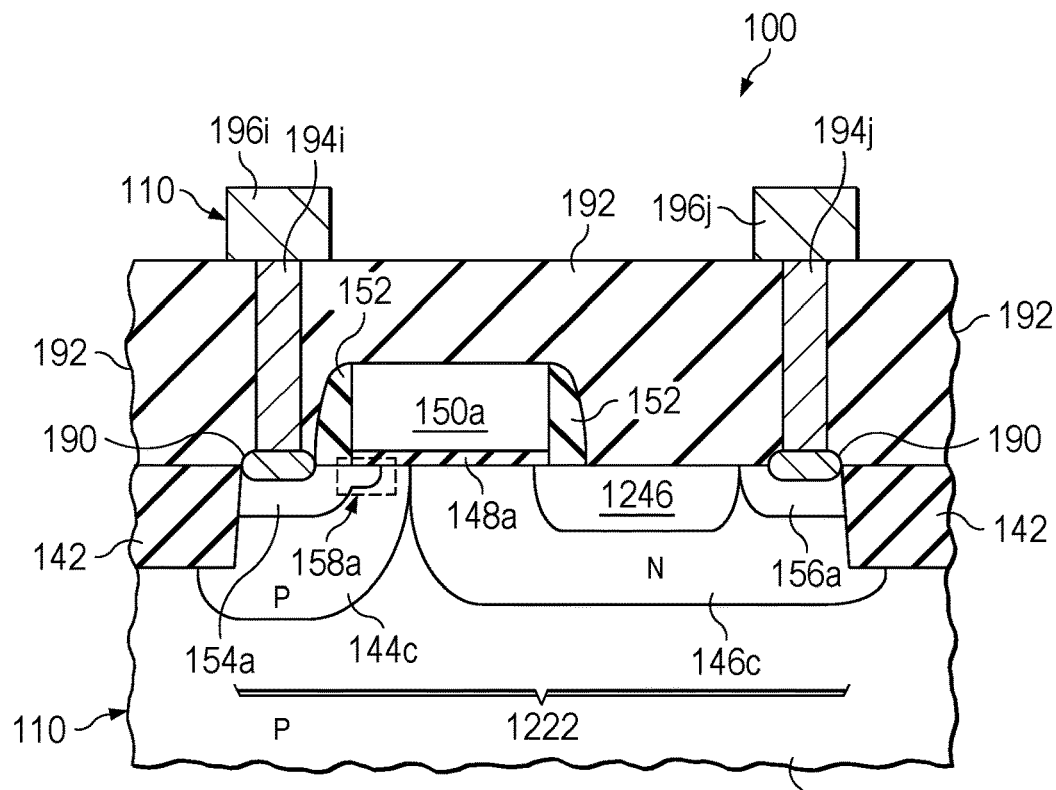
FIG. 12 is a cross section of a further example core drain extended NMOS transistor of the semiconductor device of FIG. 1 and FIG. 2.

FIG. 12 is a cross section of a further example core drain extended NMOS transistor of the semiconductor device of FIG. 1 and FIG. 2. The core drain extended NMOS transistor 1222 of this example is formed in and on the substrate 102. Elements of the core drain extended NMOS transistor 1222 of this example may be formed concurrently with corresponding elements of the core NMOS transistor 134 of FIG. 2, accruing the noted advantages of reducing fabrication cost and complexity.

The field relief dielectric layer 142 laterally isolates the core drain extended NMOS transistor 1222. The core drain extended NMOS transistor 1222 of this example includes an n-type drift region 146c which is implemented as an n-type well. A p-type well 144c is formed in the substrate 102, adjacent to the n-type drift region 146c, providing a body region for the core drain extended NMOS transistor 1222.

A thin NMOS gate dielectric layer 148a of the core drain extended NMOS transistor 1222 is formed on the substrate 102. A drain extended NMOS gate 150a of the core drain extended NMOS transistor 1222 is formed on the thin NMOS gate dielectric layer 148a. The drain extended NMOS gate 150a of this example extends partway over the n-type drift region 146c. The n-type drift region 146c extends up to the thin NMOS gate dielectric layer 148a in this example. The sidewall spacers 152 are formed on the lateral surfaces of the drain extended NMOS gate 150a.

A p-type charge balance region 1246 is formed in the substrate 102 adjacent to the drain extended NMOS gate 150a, over a portion of the n-type drift region 146c. The p-type charge balance region 1246 may be formed concurrently with the core p-type source 166 and the core p-type drain 168 of FIG. 2.

A drain extended n-type source 154a of the core drain extended NMOS transistor 1222, with a drain extended n-type source extension 158a, is formed in the substrate 102, adjacent to the drain extended NMOS gate 150a in the p-type well 144c. A drain extended n-type drain contact region 156a of the core drain extended NMOS transistor 1222 is formed in the n-type drift region 146c, adjacent to the p-type charge balance region 1246, opposite from the p-type well 144c.

The PMD layer 192 is formed over the core drain extended NMOS transistor 1222. A drain extended NMOS source contact 194i and a drain extended NMOS drain contact 194j are formed through the PMD layer 192. In this example, metal silicide 190 may be formed in situ during formation of the contacts 194a through 194h of FIG. 2 and contacts 194i and 194j by reaction of titanium in a liner of the contacts 194a through 194j with silicon in the substrate 102, thus localizing the metal silicide 190 under the contacts 194a through 194j. A drain extended NMOS source interconnect 196i and a drain extended NMOS drain interconnect 196j are formed on the PMD layer 192, as disclosed in reference to FIG. 10. The drain extended NMOS source interconnect 196i may be part of the ground network 110 in some instances of the core drain extended NMOS transistor 1222.

The core drain extended NMOS transistor 1222 of this example may provide the advantages during operation of the semiconductor device 100 disclosed in reference to FIG. 10. The p-type charge balance region 1246 may provide lower resistance for the n-type drift region 146c for instances of the semiconductor device 100 formed without a silicide blocking layer. Localizing the metal silicide 190 in situ during formation of the contacts 194a through 194j may advantageously enable use of the p-type charge balance region 1246 without a covering dielectric layer to block the metal silicide 190. In instances of the semiconductor device 100 having localized metal silicide, the core drain extended NMOS transistor 1222 of this example may be formed without adding fabrication cost or complexity.

Figure 13:
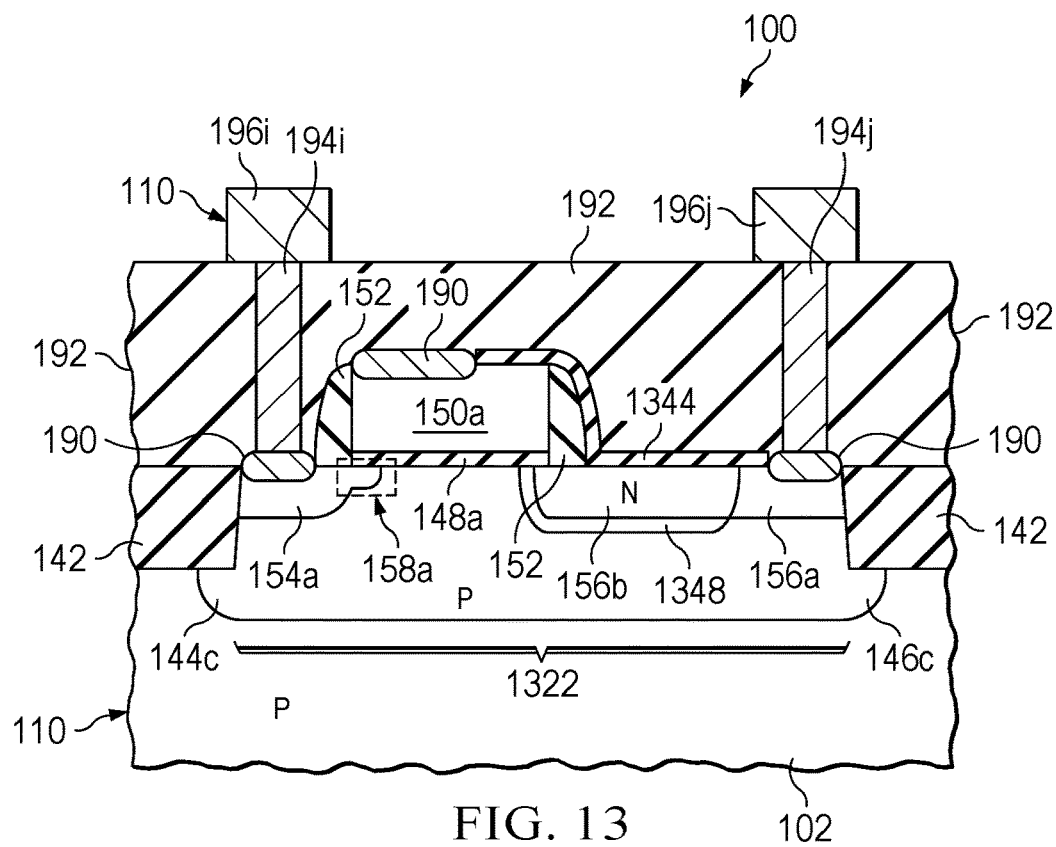
FIG. 13 is a cross section of another example core drain extended NMOS transistor of the semiconductor device of FIG. 1 and FIG. 2.

FIG. 13 is a cross section of another example core drain extended NMOS transistor of the semiconductor device of FIG. 1 and FIG. 2. The core drain extended NMOS transistor 1322 of this example is formed in and on the substrate 102. Elements of the core drain extended NMOS transistor 1322 of this example may be formed concurrently with corresponding elements of the core NMOS transistor 134 of FIG. 2, accruing the noted advantages of reducing fabrication cost and complexity.

NMOS transistor 1322. A p-type well 144c is formed in the substrate 102, adjacent to the n-type drift region 146c, providing a body region for the core drain extended NMOS transistor 1322. In this example, the p-type well 144c may extend completely under the core drain extended NMOS transistor 1322.

A thin NMOS gate dielectric layer 148a of the core drain extended NMOS transistor 1322 is formed on the substrate 102. A drain extended NMOS gate 150a of the core drain extended NMOS transistor 1322 is formed on the thin NMOS gate dielectric layer 148a. The sidewall spacers 152 are formed on the lateral surfaces of the drain extended NMOS gate 150a.

A drain extended n-type source 154a of the core drain extended NMOS transistor 1322, with a drain extended n-type source extension 158a, is formed in the substrate 102, adjacent to the drain extended NMOS gate 150a in the p-type well 144c. A drain extended n-type drain contact region 156a and an n-type drift region 156b of the core drain extended NMOS transistor 1322 are formed concurrently in the substrate 102, extending from the drain extended NMOS gate 150a to an area for a subsequently-formed drain extended NMOS drain contact 194j. The drain extended n-type drain contact region 156a and an n-type drift region 156b may be formed concurrently with the core n-type source 154 and the core n-type drain 156 of FIG. 2. A p-type compensation region 1348 is formed in the substrate 102, extending from the drain extended NMOS gate 150a to the drain extended n-type drain contact region 156a, overlapping the n-type drift region 156b. The p-type compensation region 1348 has an average p-type dopant density less than an average n-type dopant density of the n-type drift region 156b, so that a net dopant density of the n-type drift region 156b is n-type, and is significantly less than an average dopant density of the drain extended n-type drain contact region 156a. The n-type drift region 156b is thus implemented as a compensated n-type region in this example. The p-type compensation region 1348 may be formed concurrently with the core p-type source 166 and the core p-type drain 168 of FIG. 2.

In this example, a silicide blocking layer 1344, separate from the sidewall spacers 152, may be formed over the n-type drift region 156b. The silicide blocking layer 1344 may include silicon dioxide, by way of example. The silicide blocking layer 1344 may block metal silicide from over the n-type drift region 156b, enabling a higher operating potential on the drain extended n-type drain contact region 156a.

The metal silicide 190 is formed on exposed silicon, and the PMD layer 192 is formed over the core drain extended NMOS transistor 1322. A drain extended NMOS source contact 194i and a drain extended NMOS drain contact 194j are formed through the PMD layer 192. A drain extended NMOS source interconnect 196i and a drain extended NMOS drain interconnect 196j are formed on the PMD layer 192, as disclosed in reference to FIG. 10. The drain extended NMOS source interconnect 196i may be part of the ground network 110 in some instances of the core drain extended NMOS transistor 1322.

The core drain extended NMOS transistor 1322 of this example may provide the advantages during operation of the semiconductor device 100 disclosed in reference to FIG. 10. The p-type compensation region 1348 may provide lower resistance for the n-type drift region 156b. In instances of the semiconductor device 100 having silicide blocking layers, the core drain extended NMOS transistor 1322 of this example may be formed without adding fabrication cost or complexity.

While various embodiments of the present disclosure have been described above, it should be understood that they have been presented by way of example only and not limitation. Numerous changes to the disclosed embodiments can be made in accordance with the disclosure herein without departing from the spirit or scope of the disclosure. Thus, the breadth and scope of the present invention should not be limited by any of the above described embodiments. Rather, the scope of the disclosure should be defined in accordance with the following claims and their equivalents.

What is claimed is:

1. A semiconductor device, comprising:
   a ground network;
   a core bias interconnect network;
   an input/output (I/O) bias interconnect network;
   a memory bias interconnect network;
   core circuits including core n-channel metal oxide semiconductor (NMOS) transistors and core p-channel metal oxide semiconductor (PMOS) transistors having core gate dielectric layers, wherein the core circuits are coupled between the core bias interconnect network and the ground network, and wherein the core circuits are configured to operate at a core bias potential on the core bias interconnect network with respect to a ground potential on the ground network;
   I/O circuits including I/O NMOS transistors and I/O PMOS transistors having I/O gate dielectric layers thicker than the core gate dielectric layers, wherein the I/O circuits are coupled between the I/O bias interconnect network and the ground network, and wherein the I/O circuits are configured to operate at an I/O bias potential on the I/O bias interconnect network with respect to the ground potential on the ground network, the I/O bias potential being higher than the core bias potential; and
   a non-volatile memory, including a peripheral circuit configured to operate at a memory program bias potential that is higher than the I/O bias potential and configured to operate at the core bias potential that is less than the I/O bias potential, the peripheral circuit having an input buffer with an input buffer input node, wherein a threshold potential of the input buffer at the input buffer input node is less than the core bias potential.

2. The semiconductor device of claim 1, wherein:
   the peripheral circuit includes a low voltage supply detection circuit configured to operate at a memory program bias potential that is higher than the I/O bias potential and configured to operate at the core bias potential;
   the low voltage supply detection circuit includes the input buffer;
   the input buffer is coupled between the memory bias interconnect network and the ground network;
   the input buffer input node is coupled to the core bias interconnect network;
   the input buffer has an input buffer output node;
   the low voltage supply detection circuit includes an output buffer coupled between the memory bias interconnect network and the ground network;
   the output buffer has an output buffer input node coupled to the input buffer output node;
   the output buffer has an output buffer output node;
   the output buffer is configured to provide an output signal at the output buffer output node;
   the output signal is equal to a potential on the memory bias interconnect network when a potential on the input buffer input node is equal to the ground potential; and
   the output signal is equal to the ground potential when the potential on the input buffer input node is equal to the core bias potential.

3. The semiconductor device of claim 2, wherein the input buffer includes an input pull-down transistor connected to the ground network, the input pull-down transistor having a threshold potential less than the core bias potential, the input buffer input node of the input buffer being connected to a gate of the input pull-down transistor.

4. The semiconductor device of claim 3, wherein the input pull-down transistor has an extended drain drift region.

5. The semiconductor device of claim 2, wherein the output buffer includes an output pull-down transistor connected to the ground network, an input node of the output pull-down transistor being connected to the core bias interconnect network, the output pull-down transistor having a threshold potential less than the core bias potential.

6. The semiconductor device of claim 1, wherein:
the peripheral circuit includes a level shifter circuit configured to operate at a memory program bias potential that is higher than the I/O bias potential and configured to operate at the core bias potential;
the level shifter circuit includes the input buffer;
the input buffer input node is a first input buffer input node;
the input buffer includes a second input buffer input node;
the input buffer is coupled between the memory bias interconnect network and the ground network;
the threshold potential of the input buffer at the first input buffer input node is a first threshold potential;
a second threshold potential of the input buffer at the second input buffer input node is less than the core bias potential;
the input buffer has an input buffer output node;
the level shifter circuit includes an output buffer coupled between the memory bias interconnect network and the ground network;
the output buffer has an output buffer input node coupled to the input buffer output node;
the output buffer has an output buffer output node;
the output buffer is configured to provide an output signal at the output buffer output node;
the output signal is equal to a potential on the memory bias interconnect network when a potential on the first input buffer input node is equal to the core bias potential and a potential on the second input buffer input node is equal to the ground potential; and
the output signal is equal to the potential on the ground network when the potential on the first input buffer input node is equal to the ground potential and a potential on the second input buffer input node is equal to the core bias potential.

7. The semiconductor device of claim 6, wherein:
the input buffer includes a first input pull-down transistor connected to the ground network, the first input pull-down transistor having a threshold potential less than the core bias potential, the first input buffer input node of the input buffer being connected to a gate of the first input pull-down transistor; and
the input buffer includes a second input pull-down transistor connected to the ground network, the second input pull-down transistor having a threshold potential less than the core bias potential, the second input buffer input node of the input buffer being connected to a gate of the second input pull-down transistor.

8. The semiconductor device of claim 7, wherein the first input pull-down transistor has a first extended drain drift region, and the second input pull-down transistor has a second extended drain drift region.

9. The semiconductor device of claim 7, wherein:
the output buffer includes a first pull-down transistor connected to the ground network, a third input node of the first pull-down transistor being connected to the first input buffer input node of the input buffer, the first pull-down transistor having a threshold potential less than the core bias potential; and
the output buffer includes a second pull-down transistor connected to the ground network, a fourth input node of the second pull-down transistor being connected to the second input buffer input node of the input buffer, the second pull-down transistor having a threshold potential less than the core bias potential.

10. The semiconductor device of claim 1, wherein:
the peripheral circuit includes a sense circuit configured to operate at a memory program bias potential that is higher than the I/O bias potential and configured to operate at the core bias potential;
the sense circuit includes the input buffer;
the input buffer is coupled between a memory data line and the ground network;
the input buffer includes an input buffer output node;
the sense circuit includes an output buffer coupled between the core bias interconnect network and the ground network;
the output buffer has an output buffer input node coupled to the input buffer output node of the input buffer;
the output buffer has an output buffer output node;
the output buffer is configured to provide an output signal at the output buffer output node;
the output signal is equal to the ground potential when a potential on the input buffer input node of the input buffer is equal to the ground potential;
the output signal is equal to the ground potential when a potential on the input buffer input node of the input buffer is equal to the core bias potential and a data current into the input buffer from the memory data line is less than a memory threshold potential current; and
the output signal is equal to the core bias potential when a potential on the input buffer input node of the input buffer is equal to the core bias potential and the data current into the input buffer from the memory data line is greater than the memory threshold potential current.

11. The semiconductor device of claim 10, wherein the input buffer includes a passgate transistor connected to the memory data line, the passgate transistor having a threshold potential less than the core bias potential, the input buffer input node of the input buffer being connected to a gate of the passgate transistor.

12. The semiconductor device of claim 11, wherein the passgate transistor has an extended drain drift region.

13. A semiconductor device, comprising:
a semiconductor substrate;
a nonvolatile bit cell array formed in or over the semiconductor substrate, the bit cell array configured to receive an operating voltage from a memory bias interconnect network; and
a peripheral circuit coupled to the bit cell array and configured to receive the operating voltage and to provide an electrical function for operation of the bit cell array, the peripheral circuit including a drain-extended MOS (DEMOS) transistor configured to receive the operating voltage at a drain input, and to receive a core bias potential at a gate input;
wherein the electrical function includes providing an output signal that indicates that the core bias potential is below a predetermined minimum.

14. The semiconductor device of claim 13, wherein the operating voltage is at least 7 V in a programming operation and is less than 2.0 V in a read or write operation.

15. The semiconductor device of claim 13, wherein the electrical function includes shifting an input voltage to a programming voltage during a programming operation.

16. The semiconductor device of claim 13, wherein the electrical function includes providing a data state of a selected bit cell of the bit cell array.

17. The semiconductor device of claim 13, wherein a non-DE MOS transistor is connected in series between the memory bias interconnect network and the drain input.

18. The semiconductor device of claim 13, wherein the DEMOS transistor is connected in parallel with a non-DE MOS transistor.

19. The semiconductor device of claim 13, further comprising a level shifter circuit configured to disable operation in response to the output signal.

20. A method of manufacturing a semiconductor device, comprising:

forming in or over a semiconductor substrate a nonvolatile bit cell array configured to operate at an operating voltage; and forming in or over the semiconductor substrate a peripheral circuit configured to receive the operating voltage and to provide an electrical function for operation of the bit cell array, the peripheral circuit including a drain-extended MOS (DEMOS) transistor configured to receive the operating voltage at a drain input, and to receive a core bias potential at a gate input.

* * * * *